United States Patent
Palese et al.

(10) Patent No.: US 12,471,905 B2
(45) Date of Patent: Nov. 18, 2025

(54) REPAIR DEVICE FOR DEPLOYING ANCHORS INTO TISSUE

(71) Applicant: Biomet Manufacturing, LLC, Warsaw, IN (US)

(72) Inventors: Christopher M. Palese, Warsaw, IN (US); Daniel R. Norton, Warsaw, IN (US); Nathan A. Winslow, Scottsdale, AZ (US)

(73) Assignee: Biomet Manufacturing, LLC, Warsaw, IN (US)

( * ) Notice: Subject to any disclaimer, the term of this patent is extended or adjusted under 35 U.S.C. 154(b) by 301 days.

(21) Appl. No.: 18/133,848

(22) Filed: Apr. 12, 2023

(65) Prior Publication Data
US 2023/0329694 A1 Oct. 19, 2023

Related U.S. Application Data

(60) Provisional application No. 63/331,328, filed on Apr. 15, 2022.

(51) Int. Cl.
*A61B 17/04* (2006.01)

(52) U.S. Cl.
CPC .. *A61B 17/0401* (2013.01); *A61B 2017/0409* (2013.01); *A61B 2017/0433* (2013.01); *A61B 2017/0464* (2013.01)

(58) Field of Classification Search
CPC ........ A61B 17/0401; A61B 2017/0409; A61B 2017/0433; A61B 2017/0464; A61B 2017/00367; A61B 2017/0406; A61B 2017/0414; A61B 2017/0496
See application file for complete search history.

(56) References Cited

U.S. PATENT DOCUMENTS

| | | | | |
|---|---|---|---|---|
| 5,944,739 | A | * | 8/1999 | Zlock ..................... A61B 17/17 606/232 |
| 10,376,260 | B2 | * | 8/2019 | Bojarski ............ A61B 17/0401 |
| 10,499,902 | B2 | | 12/2019 | Norton |
| 11,116,495 | B2 | | 9/2021 | Stone et al. |
| 2007/0185532 | A1 | | 8/2007 | Stone et al. |
| 2008/0140093 | A1 | | 6/2008 | Stone et al. |

(Continued)

FOREIGN PATENT DOCUMENTS

WO 2023200862 10/2023

OTHER PUBLICATIONS

"International Application Serial No. PCT US2023 018326, Invitation to Pay Additional Fees mailed Jul. 5, 2023", 12 pgs.

(Continued)

*Primary Examiner* — Julian W Woo
(74) *Attorney, Agent, or Firm* — SCHWEGMAN LUNDBERG & WOESSNER, P.A.

(57) ABSTRACT

The present application relates to a tissue repair device that can include any one or combination of features including an end effector and an actuator. A deformable first anchor and a deformable second anchor can be captured by the end effector. The actuator can selectively engage the first anchor and the second anchor in a series. The actuator can deploy the first anchor from the end effector into tissue and then can be selectively moveable to engage and deploy the second anchor from the end effector into the tissue.

16 Claims, 40 Drawing Sheets

(56) References Cited

U.S. PATENT DOCUMENTS

2011/0306989 A1 12/2011 Darois et al.
2017/0290579 A1 10/2017 Norton

OTHER PUBLICATIONS

"International Application Serial No. PCT US2023 018326, International Search Report mailed Aug. 28, 2023", 8 pgs.
"International Application Serial No. PCT US2023 018326, Written Opinion mailed Aug. 28, 2023", 12 pgs.
"International Application Serial No. PCT US2023 018326, International Preliminary Report on Patentability mailed Oct. 24, 2024", 14 pgs.
"European Application Serial No. 23721539.7, Response Filed May 22, 2025 to Communication pursuant to Rules 161(1) and 162 EPC mailed Nov. 22, 2024", 30 pgs.

* cited by examiner

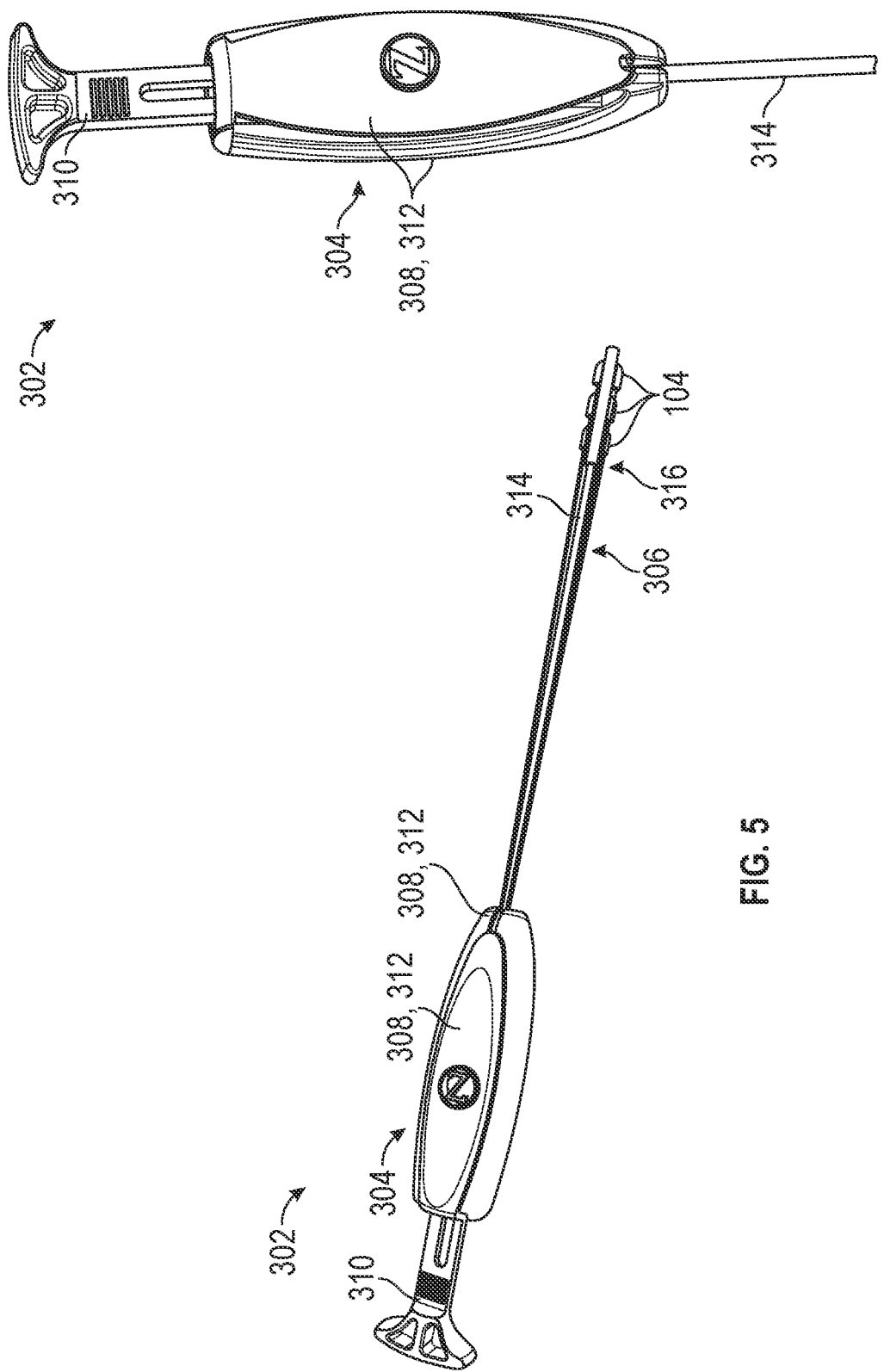

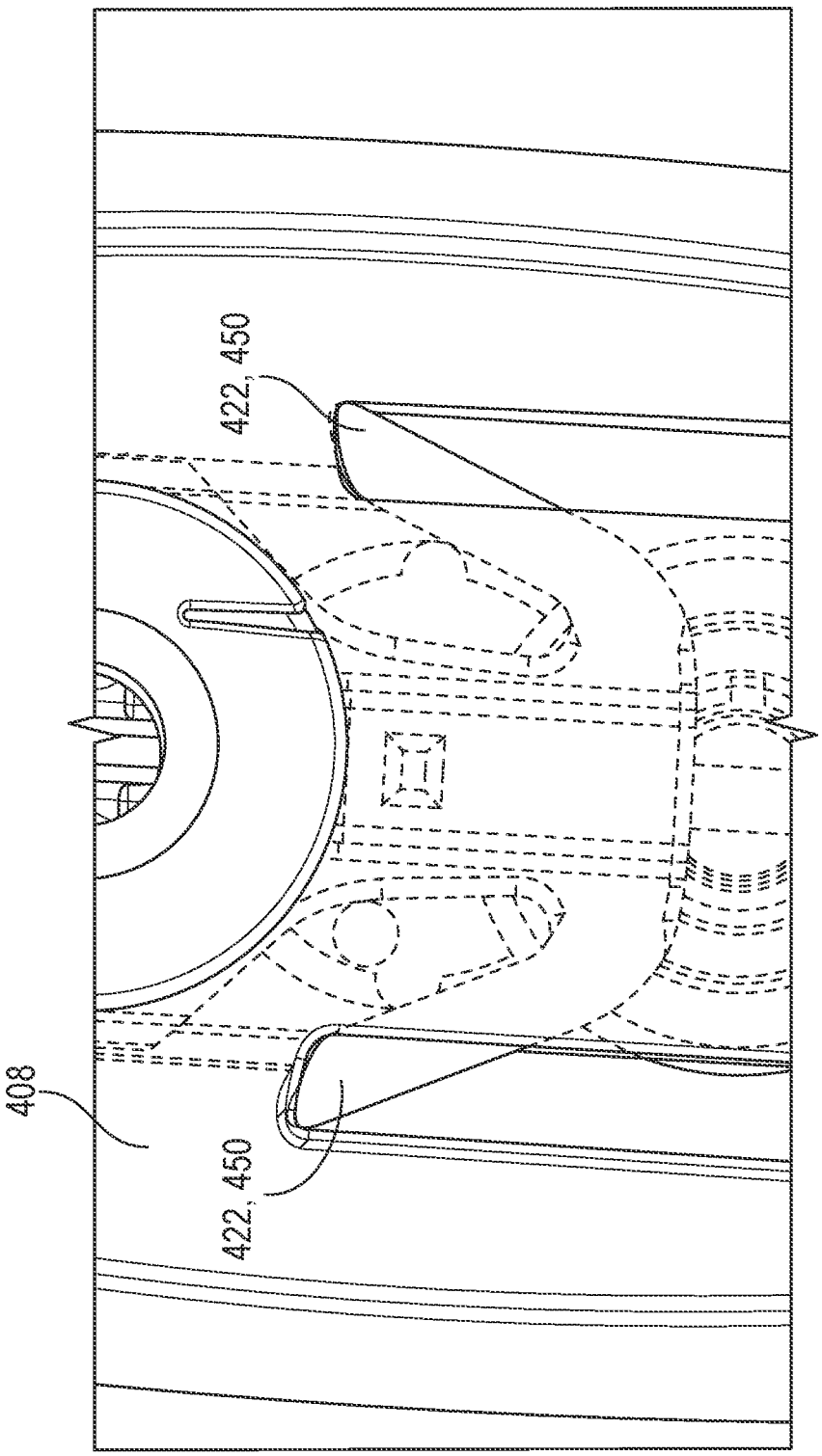

REPAIR DEVICE FOR DEPLOYING ANCHORS INTO TISSUE

CLAIM OF PRIORITY

This application claims the benefit of U.S. Provisional Patent Application Ser. No. 63/331,328, filed on Apr. 15, 2022, the benefit of priority of which is claimed hereby, and which is incorporated by reference herein in its entirety.

FIELD OF THE DISCLOSURE

The present disclosure relates to deploying anchors for bone or tissue repair surgery.

BACKGROUND OF THE DISCLOSURE

In the human body, tissue can require repair. Such tissue includes bone, muscles, tendons, ligaments and cartilage. Forceful twisting, trauma or rotation of the knee, shoulder (or other joint) can tear or otherwise damage tissue. A surgical repair of the tissue may be required. Such repair can include suturing. Various assemblies have been developed for facilitating suturing and are effective for their intended purposes. Nevertheless, tissue repair assemblies for facilitating suturing are still desirable.

SUMMARY

Various tissue repair devices comprising suture anchor deployment devices are disclosed herein. Techniques related to these devices use are also disclosed. The devices disclosed include some that can deploy multiple anchors into tissue or bone. This can improve surgical time and reduce complexity.

Tissue repair devices (commonly called inserters) are used for suture anchor deployment into tissue (including bone or soft tissue). The present inventors propose inserters that can deploy multiple suture anchors into tissue. Most surgical tissue repairs are complex and require the deployment of multiple suture anchors to anchor sutures and repair tissue in multiple locations. Typically single deployment inserters are utilized. However, the single anchor deployment inserters are more expensive as they utilize more material because the inserter must be disposed of after deployment of only a single suture anchor.

The present inventors recognize the tissue repair device can be configured to retain and organize the suture(s) coupled to the soft anchor such that the suture(s) do not become tangled during loading and deployment of the suture anchors in sequence. Furthermore, present inventors recognize the tissue repair device can be configured such that the suture anchors can be coupled to tissue via one or more sutures prior to deployment of the suture anchor while the suture anchor is still on and coupled to the tissue repair device. This can save the surgeon significant time and reduce surgical complexity.

To further illustrate the devices and related methods disclosed herein, a non-limiting list of examples is provided below. Each of the following non-limiting examples can stand on its own, or can be combined in any permutation or combination with any one or more of the other examples.

BRIEF DESCRIPTION OF THE DRAWINGS

FIG. 5 shows a tissue repair device capable of sequentially deploying three or more soft anchors in accordance with one example of the present application.

FIG. 5A is an enlarged view of a proximal portion of the tissue repair device of FIG. 5.

Corresponding reference characters indicate corresponding parts throughout the several views. Inserters in the drawings are not necessarily drawn to scale. The configurations shown in the drawings are merely examples, and should not be construed as limiting the scope of the invention in any manner.

DETAILED DESCRIPTION

Figure 1:
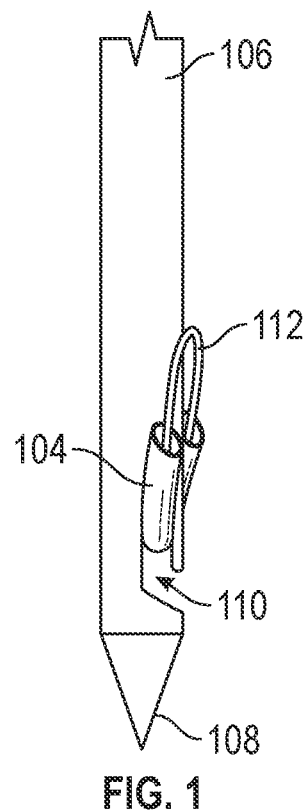
FIG. 1 illustrates a distal portion of a tissue repair device having a soft anchor carried thereby for deployment in accordance with one example of the present application.

To repair tissue (including both soft tissue and bone) in the human body a surgeon can deploy two or more soft anchors connected by a loop of suture. For example, the two or more soft anchors and the loop of suture can be utilized to repair a tear in tissue such as a meniscus or can be used to reattach muscle to bone. These soft anchors are referred to as "soft" herein as they are formed of material(s) that are flexible and/or deformable, such as a suture sleeve or other suture material. These soft suture anchors can be constructed as tubes that are collapsible once tension is applied to the suture. Soft anchors are known and include the JuggerKnot® Soft Anchor manufactured and sold by Zimmer Biomet of Warsaw, IN. Soft suture anchor such as the suture anchor 104 shown can be an elongated member having first and second ends. The first and second ends can be blunt and substantially perpendicular to a longitudinal axis of the suture anchor 104. The suture anchor 104 can be made of resorbable or non-resorbable materials, including braided suture, sponges and sponge-like materials in solid form, perforated materials, woven/braided from biocompatible materials or fibers, such as, for example, polymer, polyester, polyethylene, cotton, silk, or other natural or synthetic materials, including sponges and sponge-like materials. The suture anchor 104 can also be an elongated tubular or solid member or a two-dimensional member with or without internal bores. The suture anchor 104 can have any properties that allow the suture anchor 104 to change shape. The suture anchor 104 can be, for example, collapsible, compliant, flexible, foldable, squashable, squeezable, deformable, limp, flaccid, elastic, low-modulus, soft, spongy, perforated or any other flexible member which can change shape. In some aspects, the suture anchor 104 can be coated with biological or biocompatible coatings, and it can also be soaked in platelets and other biologics, which can be easily absorbed by the suture anchor 104. The present suture anchor 104 can utilize aspects of known techniques and devices such as ZipLoop® Technology from Zimmer Biomet. ZipLoop® Technology allows one or more sutures to be passed through or otherwise coupled to the suture anchor 104 so as to attach the one or more sutures to the suture anchor 104.

The surgeon can optionally use a tissue repair device (sometimes called a deployment device, inserter or simply device herein) to aid in deploying the anchor(s). The tissue repair device may have a needle to pierce the tissue or bone on adjacent the tear. The tissue repair device can then deploy a first of the two or more anchors, retract and deploy the second of the two or more anchors in a sequential process. This process can be continued with a third soft anchor, a fourth soft anchor, etc. It is contemplated that the surgeon can then pull on the suture to draw the two or more deployed anchors together, which can close the tear and/or re-attach the tendon or muscle to bone. The surgeon can then cut the suture. This process is further illustrated and described in reference to some of the FIGURES that follow. Deployment of a single soft anchor and creation of a loop for connection of additional anchors (or other suture or devices) is also contemplated in some aspects of this application.

There is ongoing effort to improve tissue repair devices, such as making them easier to use and have them provide for more repeatable results during a repair procedure. The tissue repair devices discussed below in further detail can provide improvements in these and other areas. For example, the present tissue repair device uses an anchor formed from a deformable material. This can be preferable to using a hard-plastic anchor, made from a relatively hard material, such as polyether ether ketone (PEEK). For example, in cases where the suture pulls through the tissue, the anchor can be dislodged within the joint or surgical space. A hard-plastic anchor can cause joint damage by moving within the joint space. Chances of damage can be reduced with a soft anchor. Furthermore, the present meniscal repair device uses two suture strands across the tissue, rather than a single suture strand, which can distribute the suture force over a larger tissue area and therefore reduce the likelihood that suture will rip through the tissue. The tissue repair devices of the present can deploy the anchors without using any pre-tied suture knots, which could rub against the femur.

Tissue repair devices for deploying soft anchors connected with the suture loop, such as those of application Ser. No. 15/482,106 (now U.S. Pat. No. 10,499,902) and application Ser. No. 16/251,342 (now U.S. Pat. No. 11,116,495 are known. These applications owned by the applicant and the contents of both are incorporated herein by reference in their entirety. The present application provides further examples of tissue repair devices that can be utilized for deploying soft anchors. One or more of the tissue repair devices disclosed herein may be preferred by a physician according to the physician's individual requirements or preferences.

FIG. 1 shows a distal portion 100 of a tissue repair device 102 having a soft anchor 104 carried thereby for deployment. The tissue repair device 102 is configured for deployment of a single anchor, the soft anchor 104. However, it is contemplated the concept could be modified as further discussed herein to deploy multiple anchors. The distal portion 100 can include a shaft 106, a point 108 and an eyelet 110. The soft anchor 104 can include one or more loops 112.

The soft anchor 104 can be preloaded onto the tissue repair device 102 prior to surgery. The shaft 106 can be configured as needle. The point 108 can be optional and can be distal of the eyelet 110. The eyelet 110 can be configured to receive and carry the soft anchor 104. The one or more loops 112 can be fixed or adjustable and can be formed of wire, suture or another material. The point 108 can be configured for punching tissue for deployment of the soft anchor 104.

Figure 2:
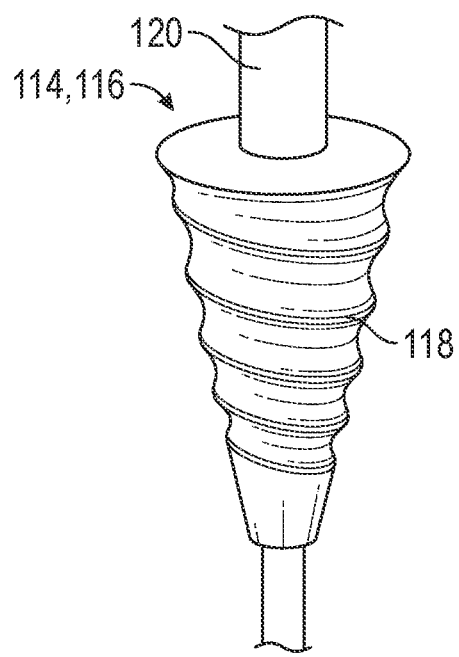
FIG. 2 shows an apparatus configured as a screw or plug that can be utilized with the tissue repair device and the soft anchor of FIG. 1 in accordance with one example of the present application.

FIG. 2 shows an apparatus 114 configured as a screw or plug 116 with threads 118. The apparatus 114 can be deployed with a driver 120 or other component which may or may not be cannulated.

Figure 3:
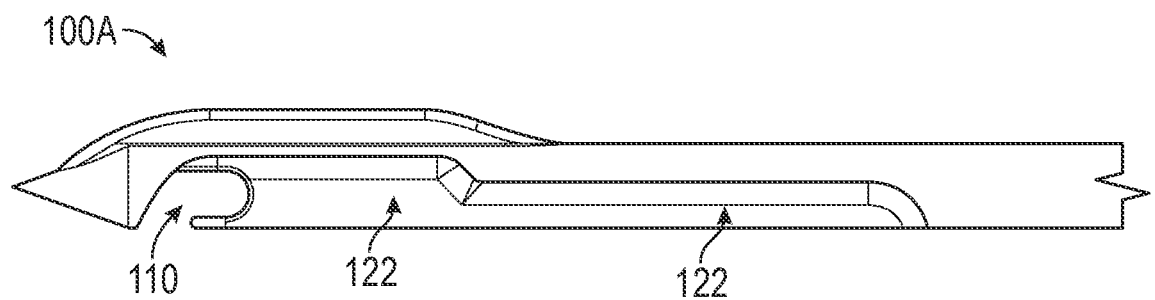
FIGS. 3 and 3A show a distal portion of a tissue repair device having a tissue piercing tip according to another example of the present application.
Figure 3A:
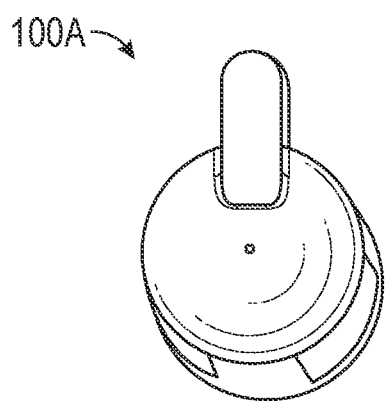

FIGS. 3 and 3A show an alternative distal portion 100A for the tissue repair device 102 previously described in FIG. 1. The distal portion 100A is similar in construction but includes a recess 122 proximal of the eyelet 110. The recess 122 can be configured to receive the soft anchor 104 (FIG.

1) therein to keep the soft anchor recessed from the outer diameter of the shaft 106. This keeps the soft anchor out of the way and out of contact from tissue when the distal portion 100A punctures tissues as described in FIGS. 4A-4E.

Figure 4A:
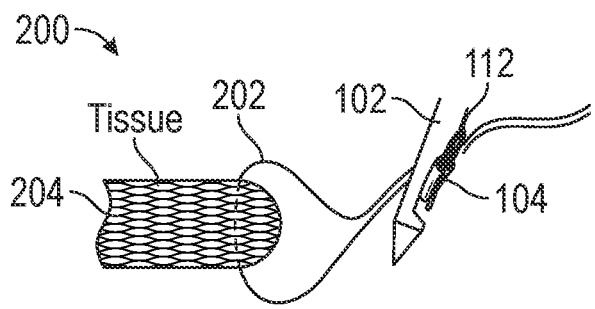
FIGS. 4A-4E show a process of deploying the soft anchor utilizing one or more of the tissue repair devices and apparatus of FIGS. 1-3 in accordance with one example of the present application.

FIGS. 4A-4E show a method 200 of performing surgery to repair tissue using the tissue repair device 102 of FIG. 1 (or FIGS. 3 and 3A), the soft anchor 104 and the apparatus 114 of FIG. 2. As shown in FIG. 4A, the soft anchor 104 with the one or more loops 112 can be preloaded on the tissue repair device 102. One or more sutures 202 can be passed through soft tissue 204. These one or more sutures 202 can also be passed through the one or more loops 112 (FIG. 1) and/or the soft anchor 104 itself.

Figure 4B:
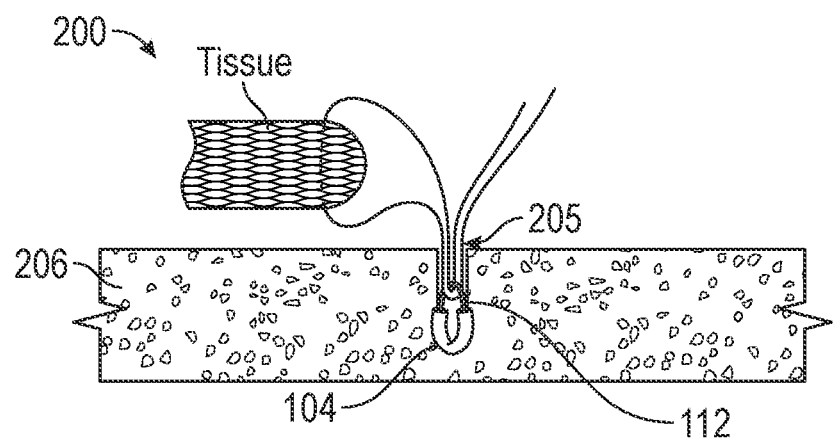
Figure 4C:
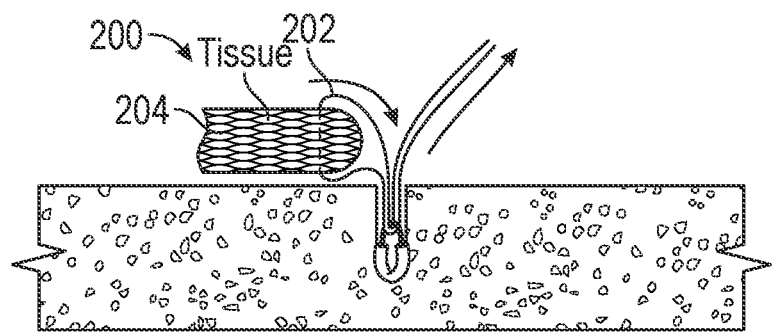
Figure 4D:
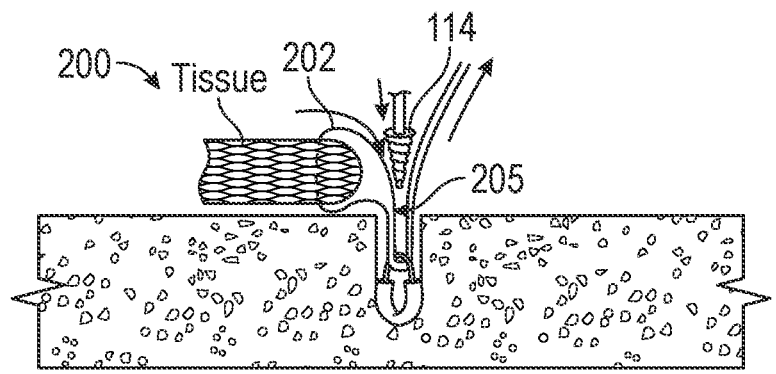
Figure 4E:
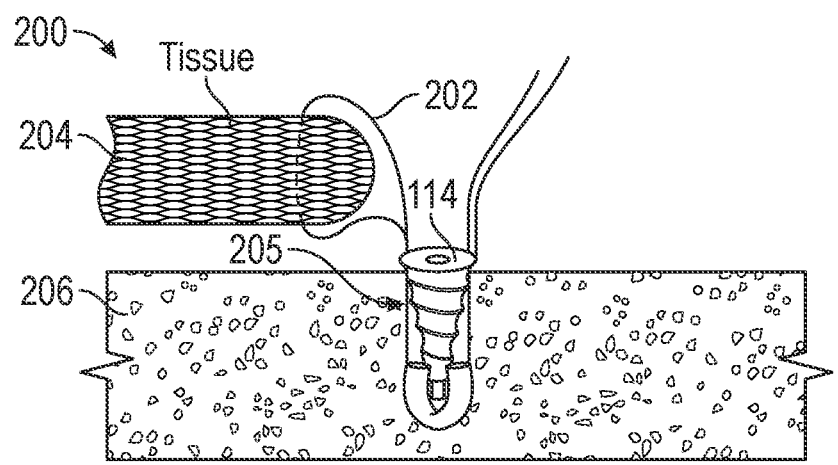

FIG. 4B shows the method 200 with the soft anchor 104 deployed into a puncture (an aperture 205) formed in bone 206. This aperture 205 can be formed by the tissue repair device 102 acting as an inserter. The one or more sutures 202 can extend into the aperture in the bone 206. FIG. 4C shows one or more sutures 202 are tensioned to draw the soft tissue 204 toward the aperture 205. FIG. 4D shows the apparatus 114 being deployed toward the aperture 205 once the one or more sutures 202 are tensioned as desired. FIG. 4E shows the apparatus 114 fit down into the aperture 205 creating an interference fit or similar fit with the bone 206. The arrangement of the apparatus 114 in the aperture 205 can capture and hold the one or more sutures 202 and the soft anchor 104 within the bone 206 as desired. The soft tissue 204 can held by the one or more sutures 202 relative to the bone 206 by the apparatus 114 (e.g., by an interference fit of the apparatus 114 in the aperture 205).

FIGS. 5 and 5A show a tissue repair device 302 capable of sequentially deploying three or more soft anchors 104. The manner of such deployment and methodology will be discussed further subsequently but can include the techniques described in FIGS. 4A-4E, for example. However, other known techniques of using soft anchors 104 for repair is also contemplated. For example, for a meniscal repair a procedure to repair the meniscus using soft anchors 104 is discussed in application Ser. No. 15/482,106, the disclosure of which is incorporated by reference above in its entirety.

The tissue repair device 302 includes a proximal portion 304 and a distal portion 306 (FIG. 5 only). The proximal portion 304 can include a handle 308 and actuator 310. The handle 308 can be formed of one or more housings 312 as further discussed. The distal portion 306 can include a shaft 314 (can be cannulated or uncannulated) and end effector 316. The end effector 316 can be configured to carry and aid in deployment of the soft anchors 104 (FIG. 5) as further discussed in subsequent FIGURES.

Figure 5B:
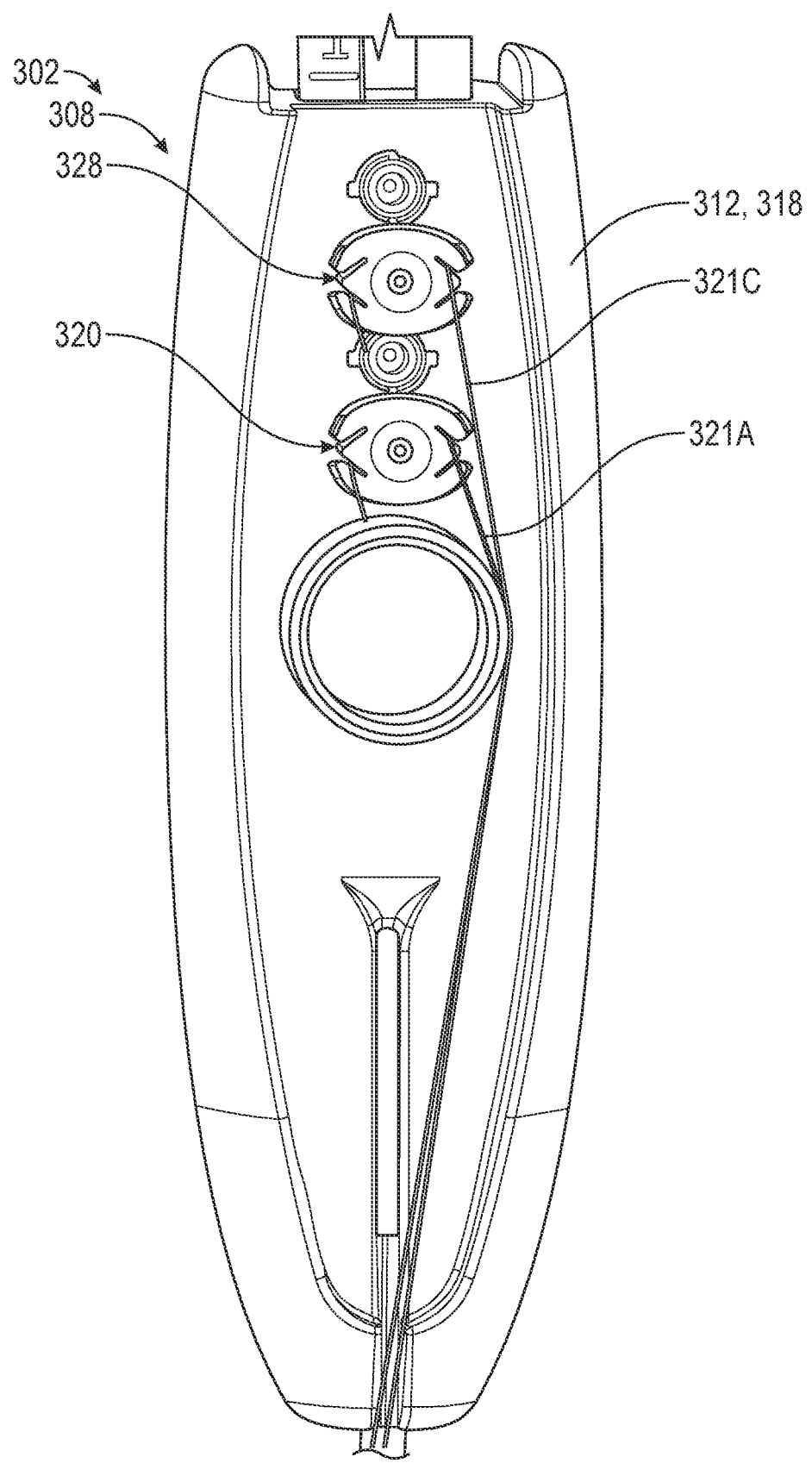
FIG. 5B is a schematic view showing components of the proximal portion of the tissue repair device of FIGS. 5 and 5A.
Figure 7:
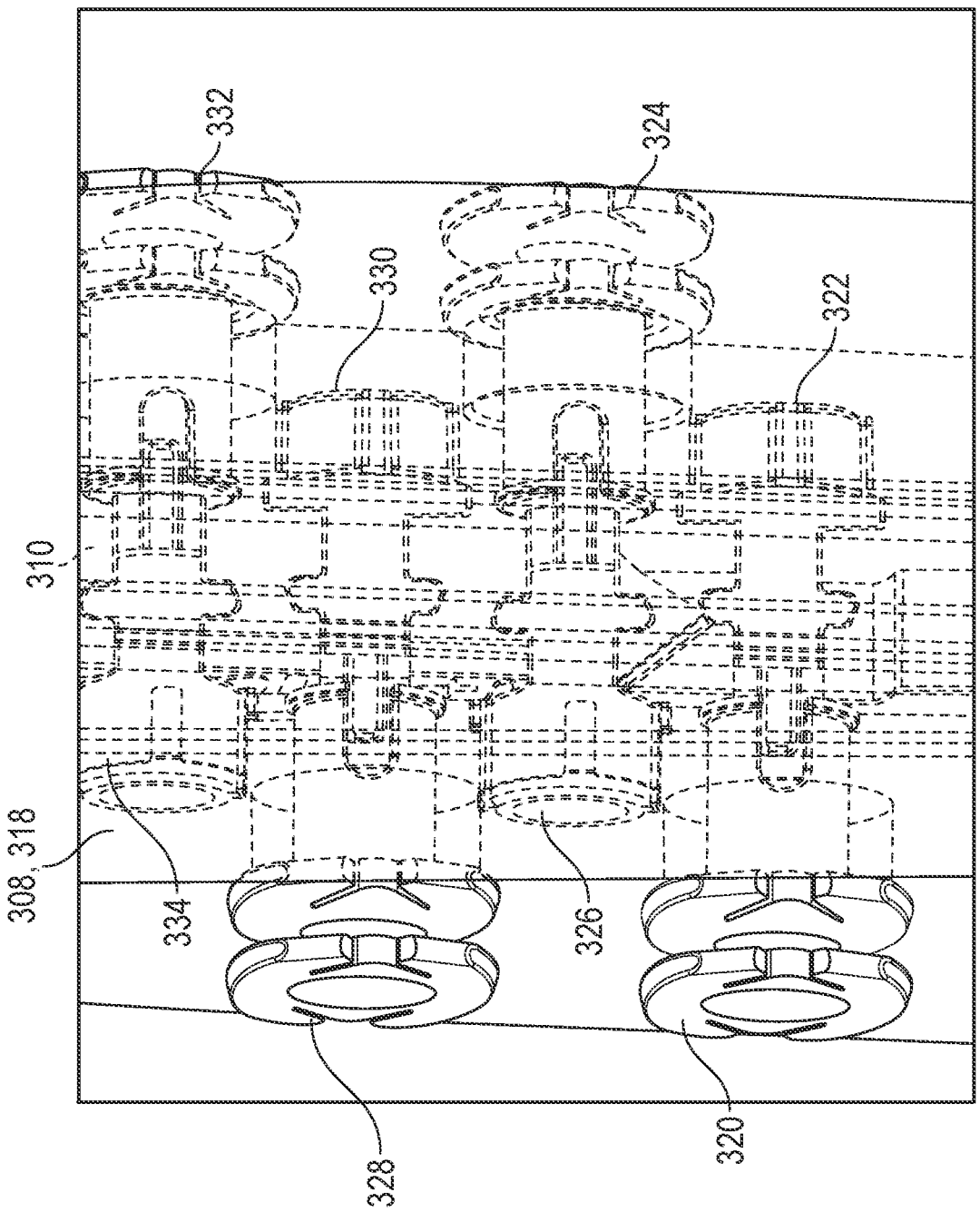
FIG. 7 is a schematic view of some components of the proximal portion of the tissue repair device of FIG. 5.

FIG. 5B shows the tissue repair device 302 with a portion of the handle 308 comprising a second portion removed leaving only a first portion 318 of the one or more housings 312. FIG. 7 shows a schematic side view through the first portion 318 of the one or more housings 312 and illustrating components internal to the handle 308. Together FIGS. 5B and 7 show combinations of the components that can be internal to the handle 308. The components are best shown in FIG. 7 and can include a first spool 320, a first locking mechanism 322, a second spool 324, a second locking mechanism 326, a third spool 328, a third locking mechanism 330, a fourth spool 332 and a fourth locking mechanism 334.

Each spool can be coupled with an associated locking mechanism. Thus the first spool 320 can be coupled to the first locking mechanism 322, the second spool 324 can be coupled to the second locking mechanism 326, etc. The locking mechanisms 322, 326, 330 and 334 can pass through the actuator 310 and can interact with the actuator 310 as further discussed herein.

FIG. 5B shows respective sutures coupled to particular anchors 104 (a first anchor 104A in FIG. 6A and a third anchor 104C in FIG. 5C) can pass up to the proximal portion 304 and into the handle 308. The sutures can wrap around respective ones of the first spool 320 and the third spool 328. Thus, the first spool 320 can be coupled to the first anchor 104A (FIG. 5B and FIG. 6A) by at least one suture 321A and the second spool 324 can be coupled to the second anchor 104B (FIG. 6A) by a least another suture (not shown). The third spool 328 can be coupled to the third anchor 104C (FIG. 6A) by a least another suture 321C (FIG. 5B and FIG. 6A). Spools 320, 324, 328 and 332 (see FIG. 7) can be configured to selectively turn as controlled by associated locking mechanisms 322, 326, 330 and 334 to unwrap respective sutures with deployment of the respective soft anchor 104 into tissue as further described.

Turning back to FIG. 7, each of the locking mechanisms 322, 326, 330 and 334 has a respective tab 336 or other feature configured to lock the associated spool 320, 324, 328 and 332.

Figure 6B:
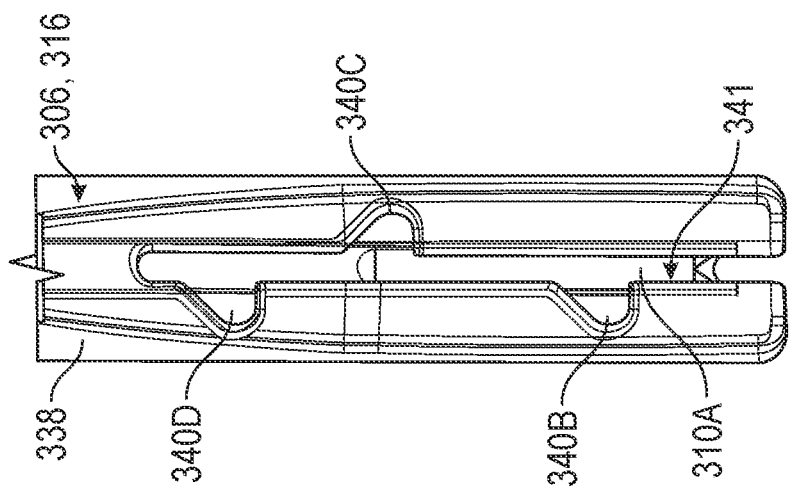
FIGS. 6A and 6B show an example of the distal portion of the tissue repair device of FIG. 5.
Figure 6A:
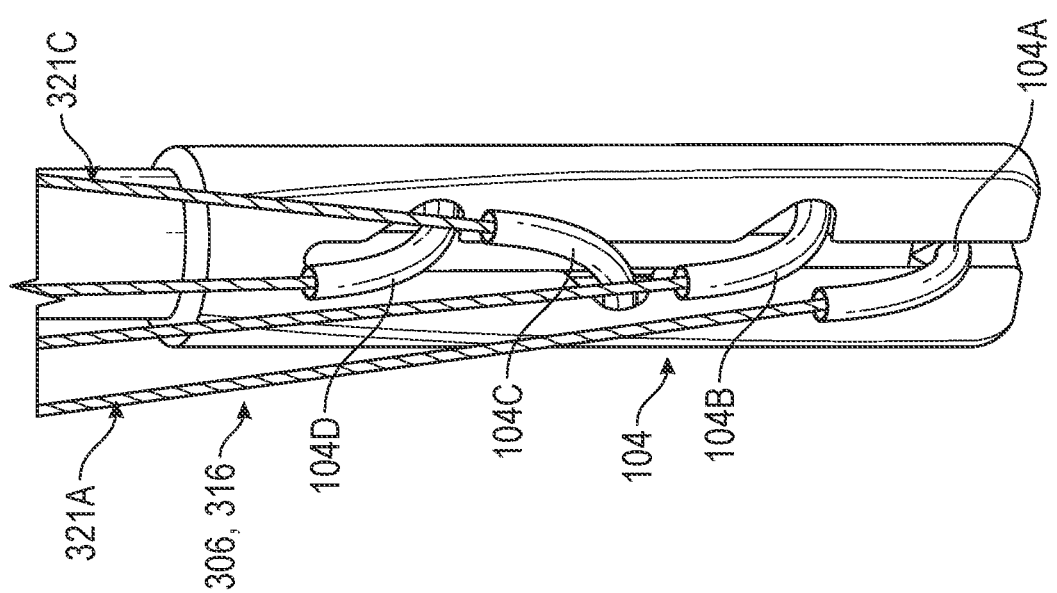

FIGS. 6A and 6B show and example of the end effector 316 of the distal portion 306. Reviewing FIG. 6B, the end effector 316 can be configured as a fixed jaw stator outer housing 338 and a moveable actuator 310A (FIG. 6B). The actuator 310A can be coupled back directly or indirectly to the actuator 310 (FIGS. 5-5B). Thus, the actuator 310A can be part of the actuator 310 according to some examples. The actuator 310A can move relative to the outer housing 338 of the end effector 316. The outer housing 338 can form a series of longitudinally spaced notches 340B, 340C and 340D. These notches 340B, 340C and 340D can be configured to receive at least one respective soft anchor 104B, 104C and 104D therein as shown in FIG. 6A. Also as shown in FIG. 6A, a first soft anchor 104A can initially be loaded on the actuator 310A for a first deployment. The soft anchors 104B, 104C and 104D can then be sequentially deployed as further discussed and illustrated herein. It is contemplated that the end effector could be modified with further notches or larger notches (i.e. those capable of carrying more than one suture). The actuator 310A can be configured as a piercing device to pass through soft tissue, bone, etc. in deployment of the soft anchors 104A, 104B, 104C and 104D. FIG. 6A shows respective sutures extending back from the soft anchors 104A, 104B, 104C and 104D to the respective spools 320, 324, 328 and 332 (reference FIGS. 5B and 7).

FIGS. 8A-8E show part of the deployment process of a soft anchor using the tissue repair device 302. The handle has been removed in FIGS. 8A-8E and subsequent FIGS. for better visualization.

Figure 8A:
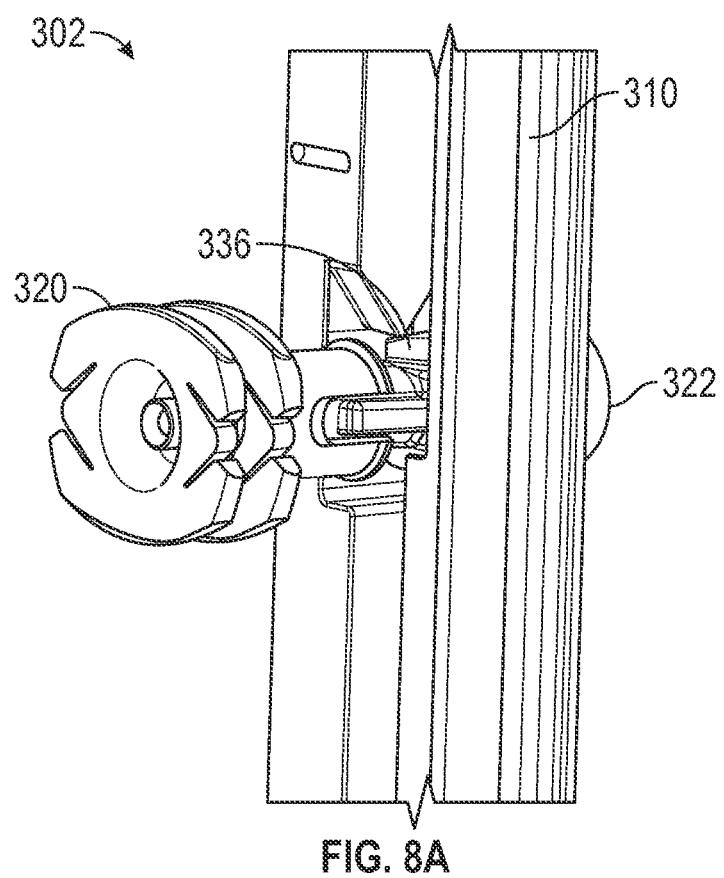
FIGS. 8A-8E illustrate operation of suture spools and locking mechanisms used within the proximal portion during deployment of the soft tissue anchors in accordance with one example of the present application.
Figure 8B:
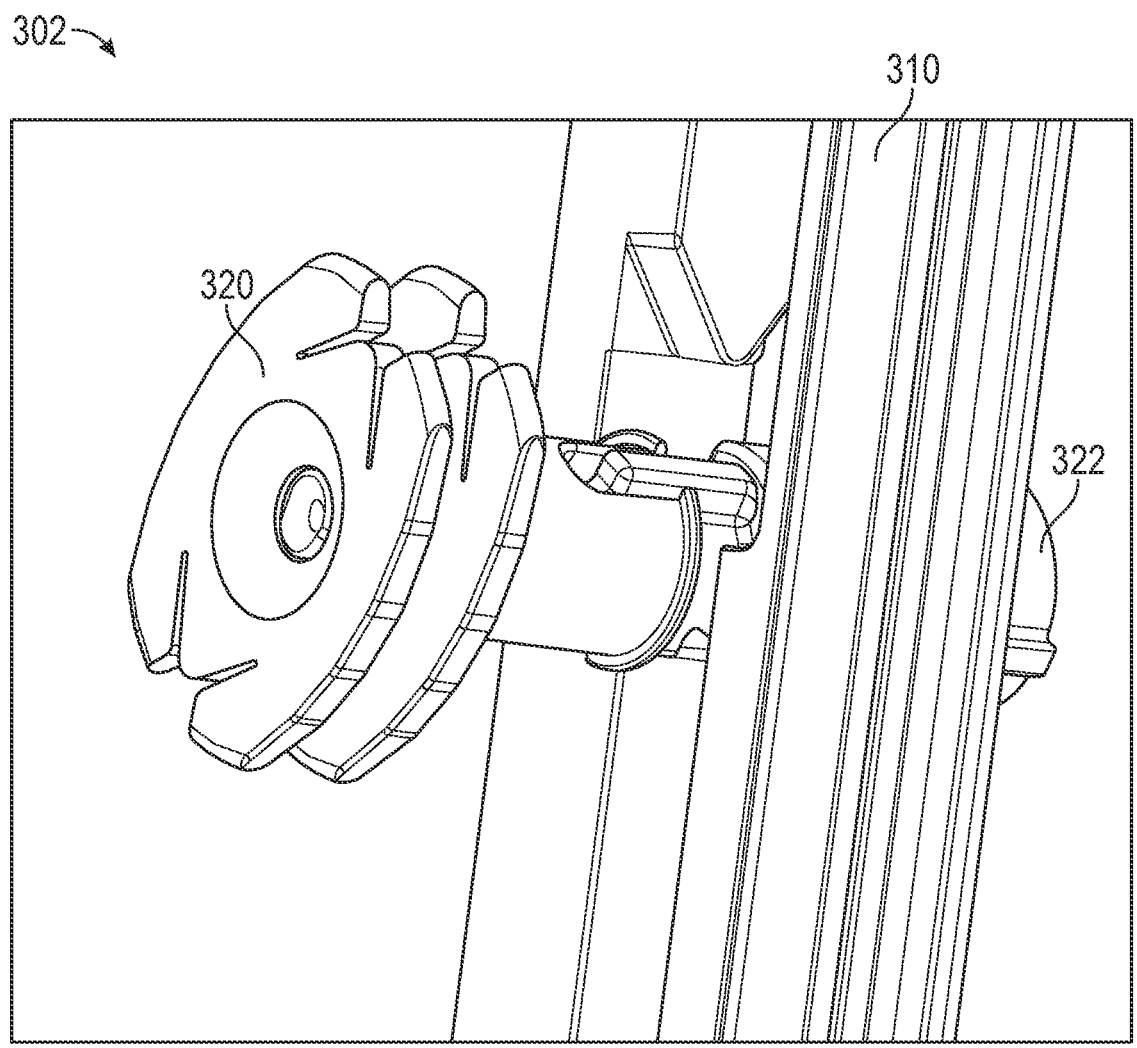
Figure 8C:
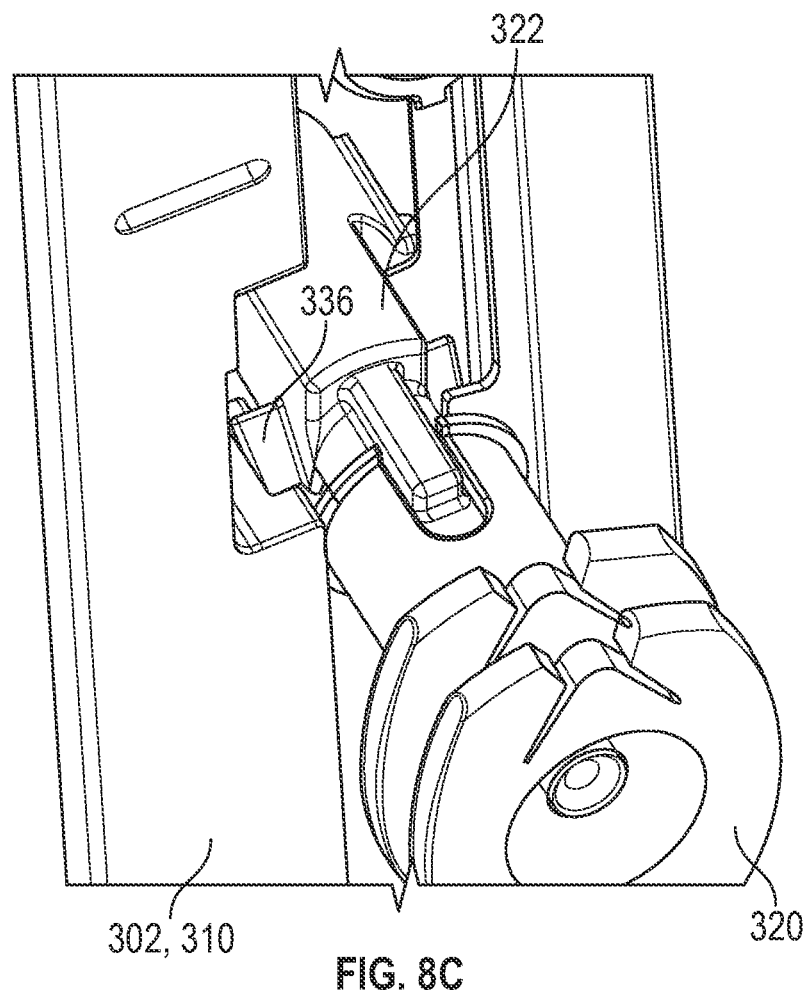
Figure 8D:
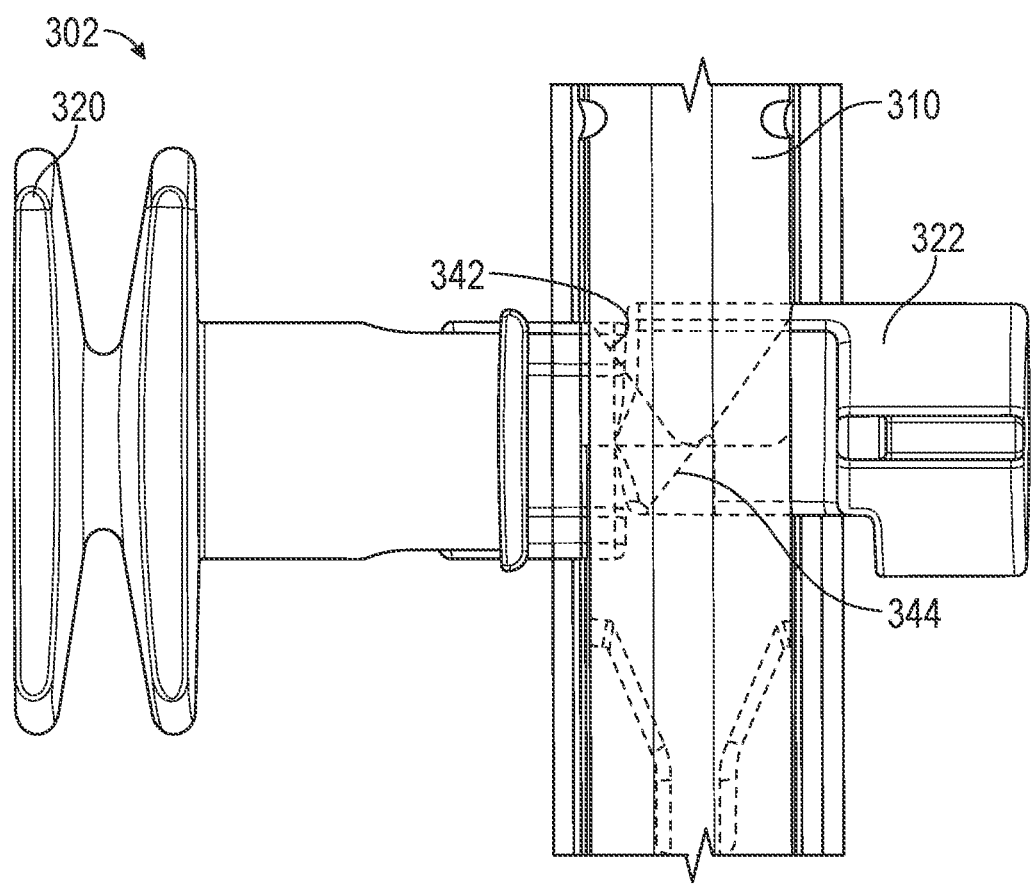
Figure 8E:
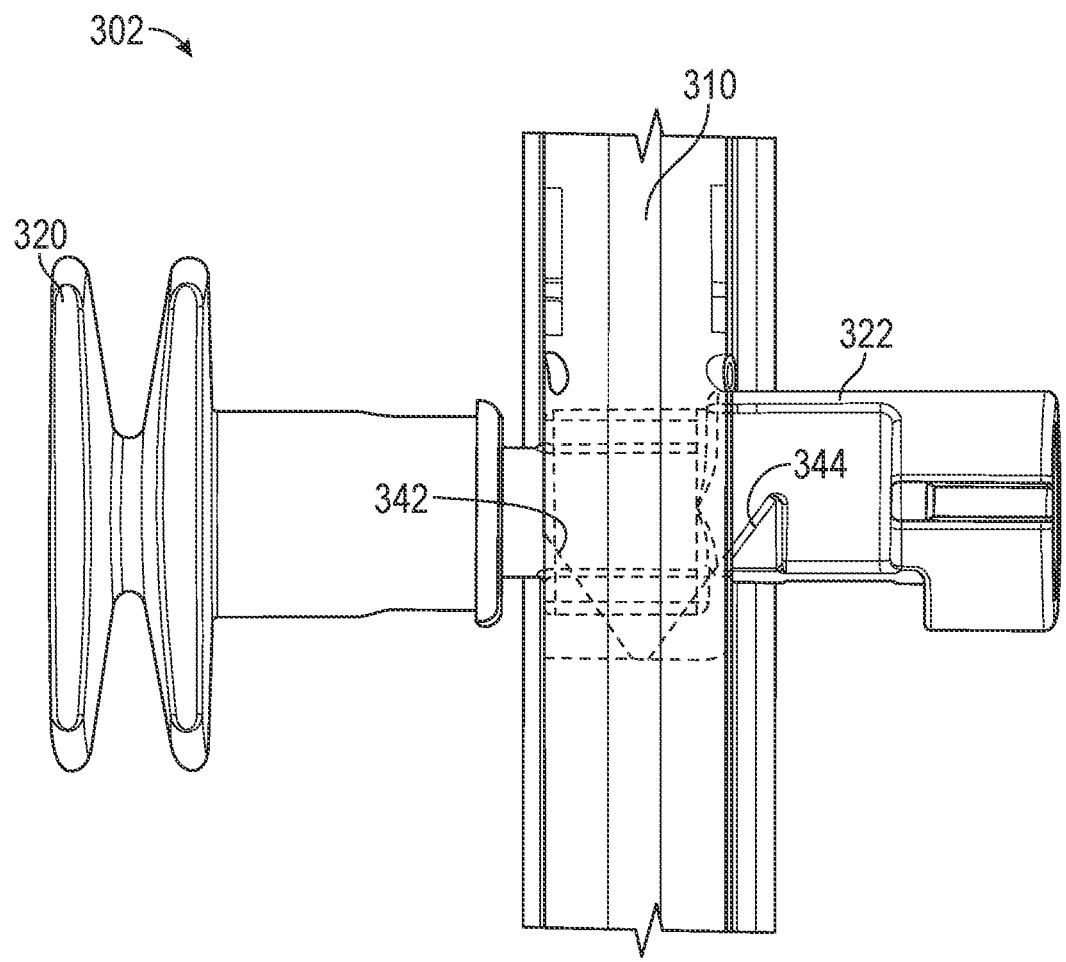
Figure 9:
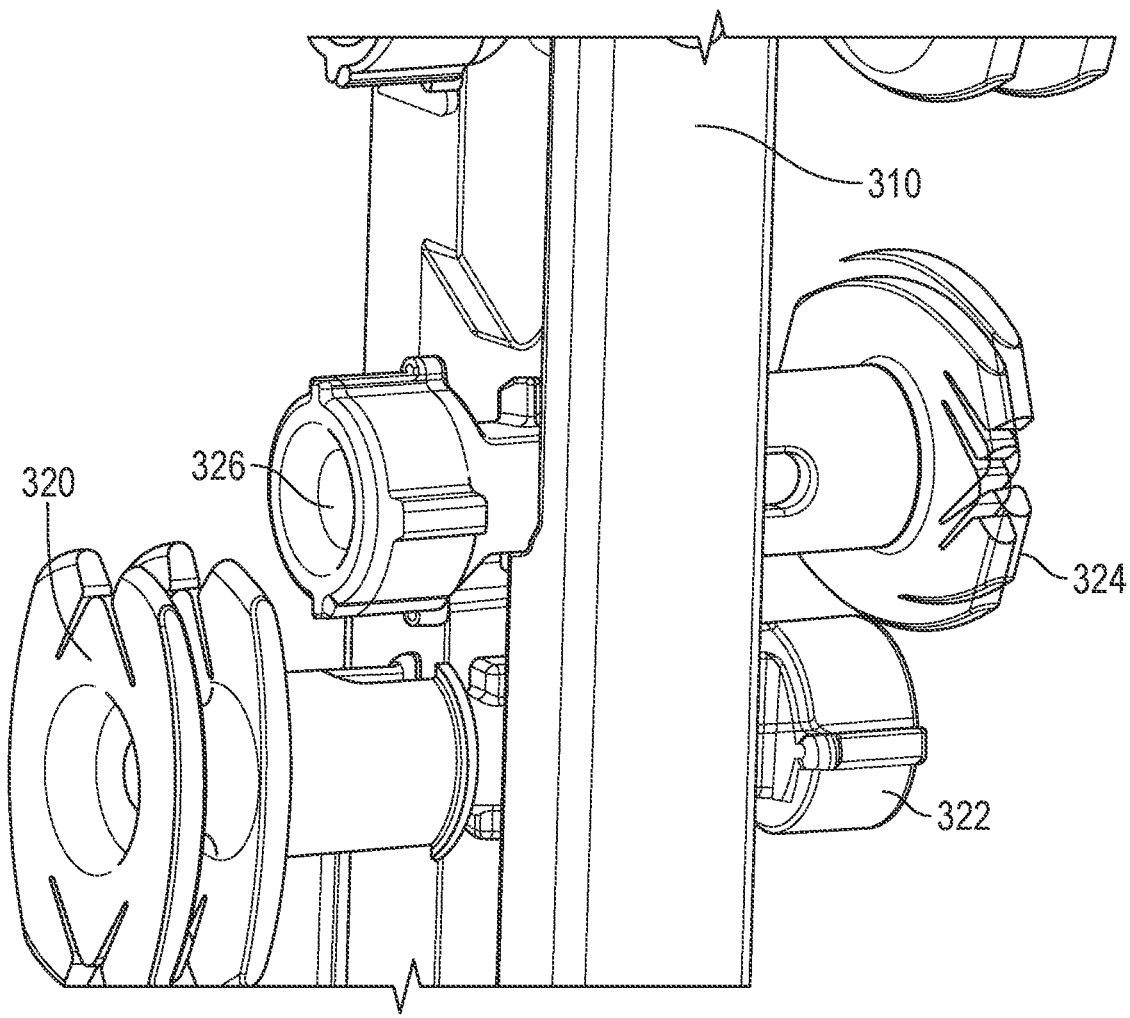
FIG. 9 shows operation of two suture spools and locking mechanisms after deployment of a first anchor into tissue and preparing for deployment of a second soft anchor in accordance with one example of the present application.

FIGS. 8A-9 reference the first spool 320 and first locking mechanism 322 with the understanding a similar process can be repeated with the other spools and other locking mechanisms in respective deployment sequence for associated soft anchor.

FIGS. 8A-8C show that the surgeon manipulates the actuator 310 (e.g., pulls up on the actuator 310), it causes the locking mechanism 322 to rotate substantially 90 degrees in the direction that the suture wraps around the first spool 320. At 90 degrees, the bottom of the tab 336 contacts a ledge on the actuator 310, and one or more other tabs 336 hit associated stops on the housing (not shown). This prevents the surgeon from pulling the actuator 310 back too far and releasing multiple anchors at once. FIG. 8C visually illustrates stops that would contact the housing (not shown)

and/or the actuator 310. FIGS. 8A-8C show rotation of the first spool 320 from a first position (FIG. 8A) 90 degrees to a second position (FIG. 8C).

FIGS. 8D and 8E show when the surgeon actuates the actuator 310 (e.g., pushes down on the actuator 310 to advance the anchor) a V-shaped feature 342 of the actuator 310 contacts an angled face 344 on the locking mechanism 322. The interaction of the V-shaped feature 342 and the angled face 344 can push the first locking mechanism 322 away from the first spool 320. This allows the first spool 320 to spin freely to unwind suture as the first anchor 104A (FIG. 6A) is advanced into the tissue.

Figure 10:
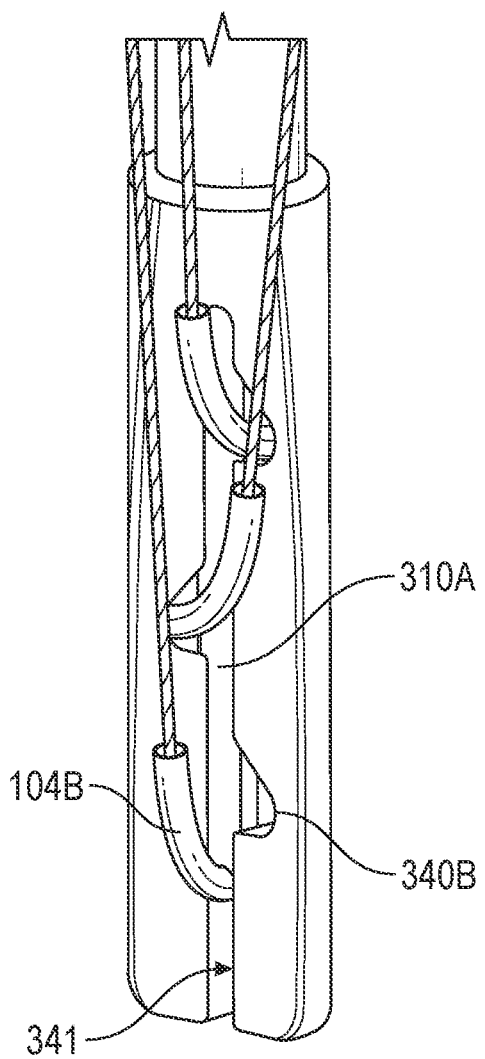
FIG. 10 illustrates the distal tip of the tissue repair device of FIG. 5 with a second anchor being deployed toward the tissue with the spool and locking mechanism shown in FIG. 9 in accordance with one example of the present application.

FIG. 9 illustrates that after advancing the first anchor into tissue such as bone, the surgeon can actuate the actuator 310 back into a non-deployment position. This can be accomplished by pulling back proximally on the actuator 310. The process previously described and illustrated in FIGS. 8A-8E can then be repeated for the second spool 324 and the second locking mechanism 326. With the first locking mechanism 322 rotated and moved first out of the way of the actuator 310, and the actuator 310 can hit a hard stop after rotating the second spool 324 substantially 90 degrees as previously shown in FIG. 8C. When the second spool 324 is rotated substantially 90 degrees, this can put tension on the suture coming from the second anchor 104B (FIGS. 6A and 10) as the actuator 310A (FIGS. 6A and 10) passes the notch 340B holding the second anchor 104B. This pulls the second anchor 104B out of the notch 340B and into the central slot 341 at the end effector 316 as shown in FIG. 10. When the actuator 310 is advanced, the actuator 310A (e.g., with a forked or otherwise configured capture mechanism at a distal end thereof) picks up the second anchor 104B as shown in FIG. 10. The steps describe in FIGS. 8A-9 can be repeated for deployment of the third anchor 104C and the fourth anchor 104D.

Figure 11:
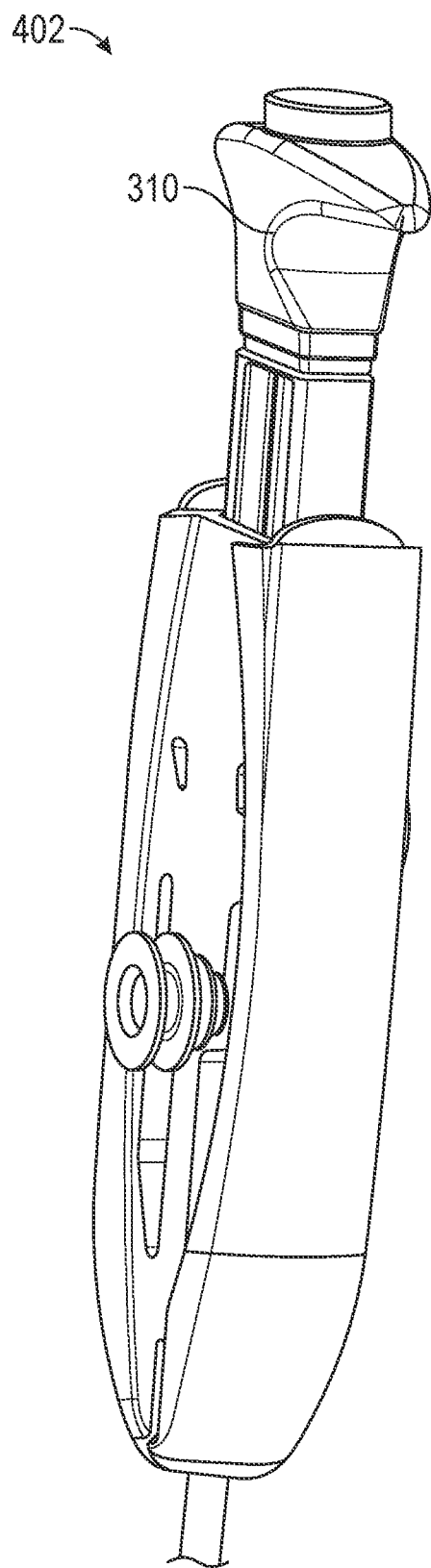
FIG. 11 shows a proximal portion of a tissue repair device according to another example of the present application.
Figure 11A:
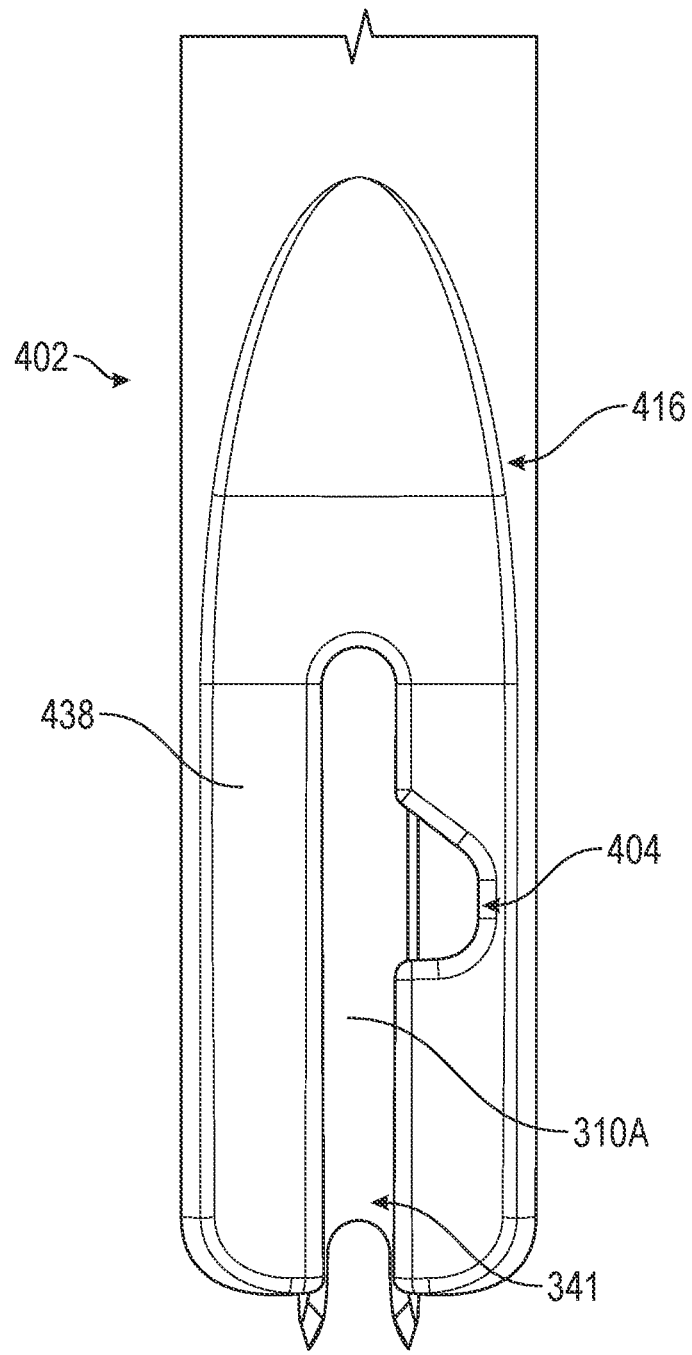
FIGS. 11A and 12 shows a distal portion of the tissue repair device of FIG. 11 in accordance with one example of the present application.

FIGS. 11 and 11A show an alternative construction for a tissue repair device 402 according to another example. This embodiment can have many features similar to that of the tissue repair device 302 previously described including the capability to deploy multiple anchors. The discussion of tissue repair device 402 with thus focus only on major differences between the tissue repair device 402 and the tissue repair device 302 previously described.

The tissue repair device 402 can include two assemblies of spools rather than four as previously described. The end effector 416 can be configured to deploy two anchors into tissue rather than four anchors. To this end, the end effector 416 may employ the actuators 310 and 310A as previously described and a single notch 440.

Figure 12:
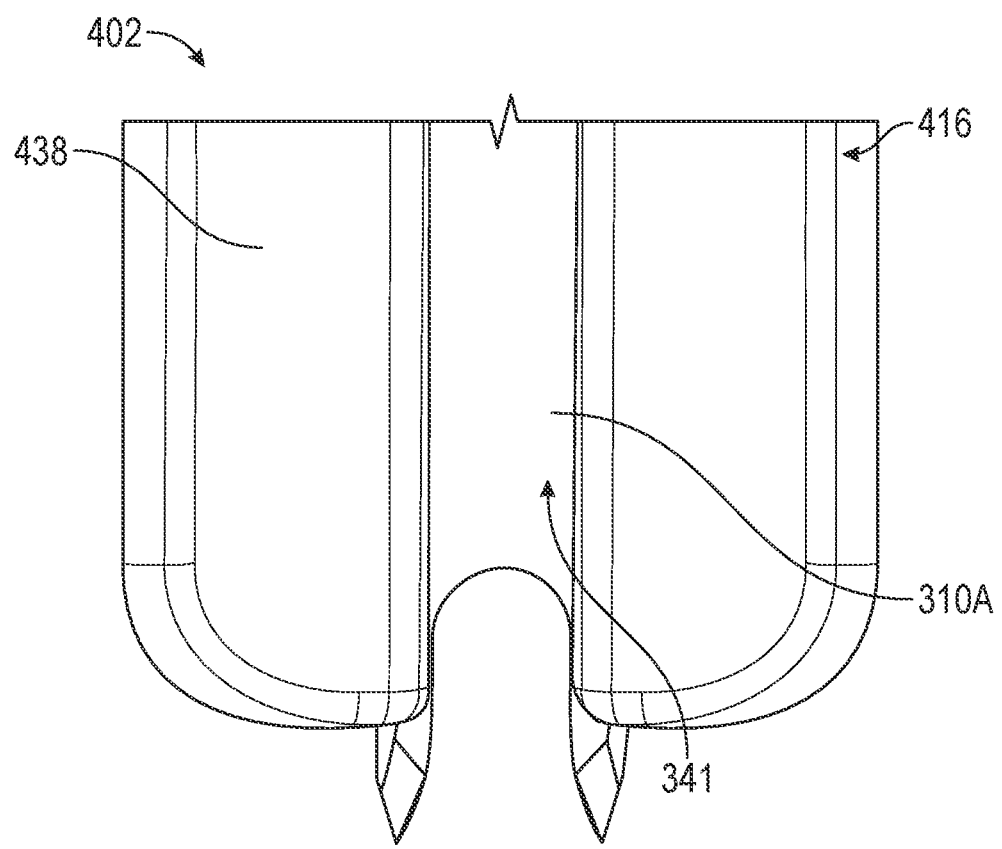

As shown in FIGS. 11A and 12, the actuator 310A can protrude distally from the slot 341 of the end effector 416 formed by the stator outer housing 438. The outer housing 438 can be differently shaped from the outer housing 338 (FIGS. 6A and 6B) but can operate in a similar manner to form the slot 341 and notch 440.

Figure 13:
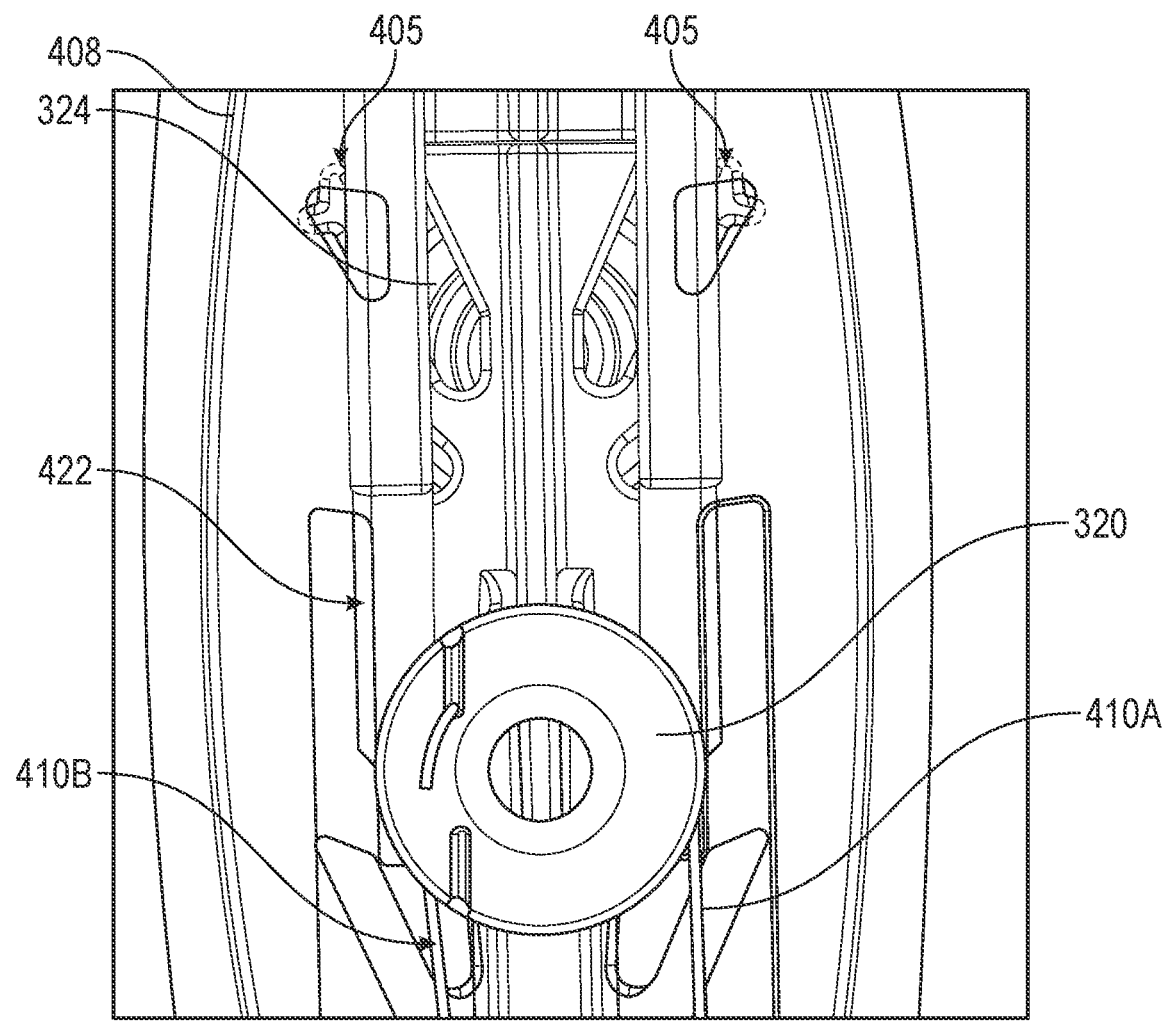
FIGS. 13 and 13A show aspects of the proximal portion of the tissue repair device of FIG. 11 including various components thereof including a spools and a locking mechanism anchor in accordance with one example of the present application.

Turning to FIG. 13, a single locking mechanism 422 coupled to a first spool 320 and a second spool 324 is illustrated. The locking mechanism 422 can engage a notch 405 in the handle 408. This engagement can prevent the actuators 310A and 310 (FIGS. 11-12) from sliding backwards as the actuator 310A engages the tissue.

As shown in FIG. 13, suture 410A from a first soft anchor runs directly to the first spool 320. Suture 410B from the second soft anchor enters the handle 408 on the same side as the suture 410B but passes through the middle of the handle 408 in-between the locking mechanism 422 and the handle 408 before wrapping around the second spool 324.

Figure 13A:
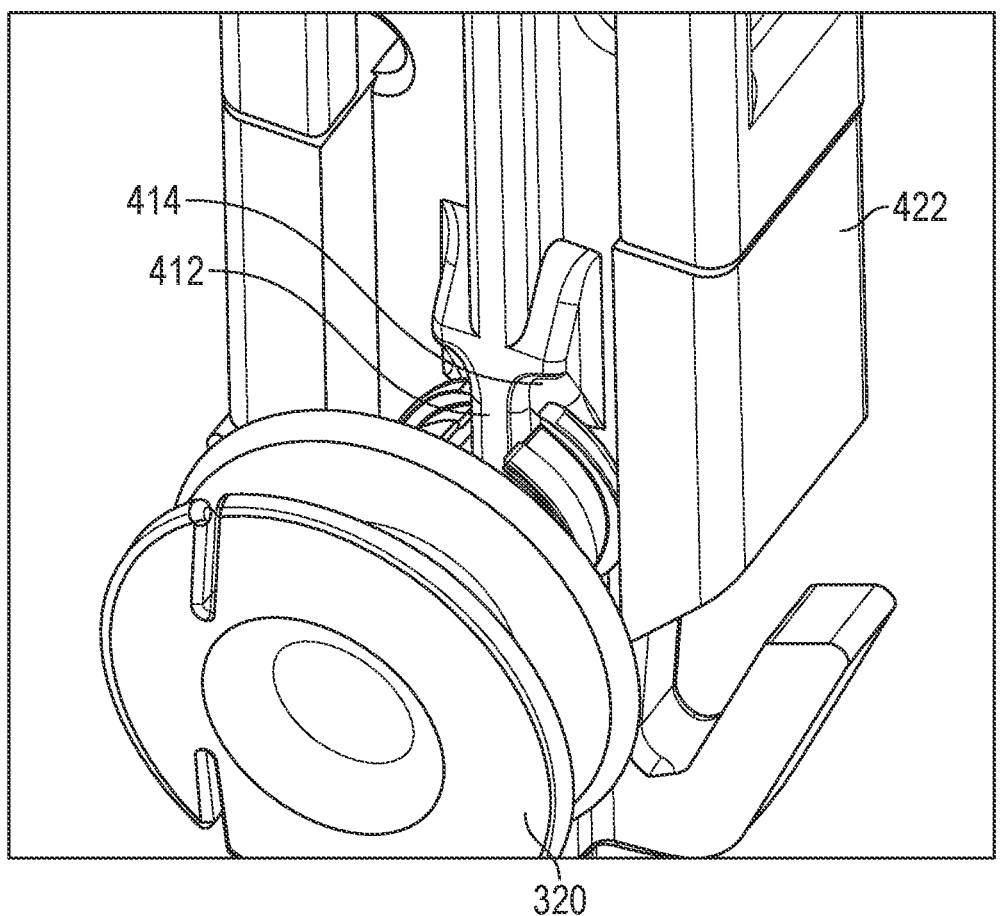

FIG. 13A shows the first spool 320 coupled to the locking mechanism 422 with the handle removed. A rib 412 on locking mechanism 422 prevents rotation of first spool 320. As the first anchor is driven into tissue (e.g., by striking or otherwise apply force to the actuator 310), a ramp feature 414 on the locking mechanism 422 pushes the first spool 320 outward, disengaging the rib 412 and uncoupling the first spool 320 from the locking mechanism 422. This allows the first spool 320 to spin freely as the first anchor is advanced.

Figure 14A:
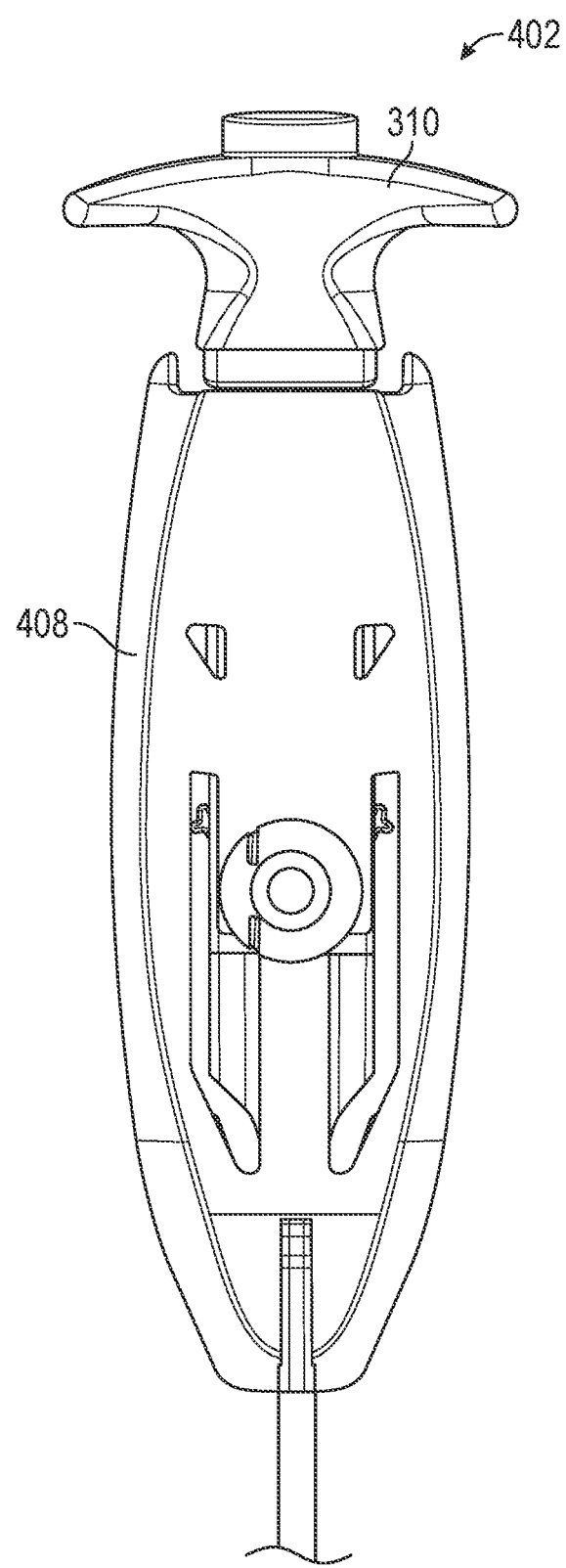
FIGS. 14A and 14B show the tissue repair device of FIGS. 11-13A operating to drive a soft anchor into tissue with a punch in accordance with one example of the present application.
Figure 14B:
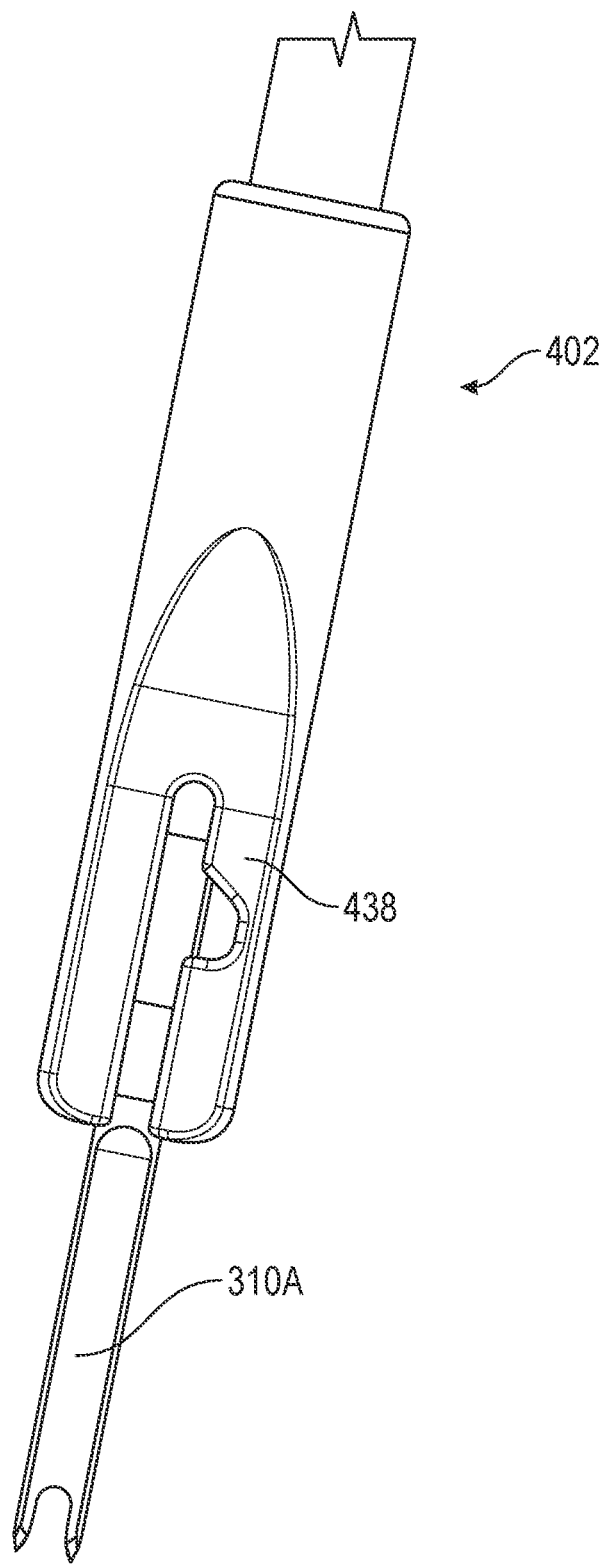

FIGS. 14A and 14B show the tissue repair device 402 with the actuator 310A (FIG. 14B) fully extended out of a tip of the outer housing 438. Internal components of the handle 408 have shifted position (FIG. 14A) with movement of the actuator 310 fully distally downward. The first anchor can be driven downward into tissue by holding downward pressure on the handle 408 to hold a desired position on the tissue while striking or otherwise applying force to the actuator 310 to drive the 310A into the tissue.

Figure 15:
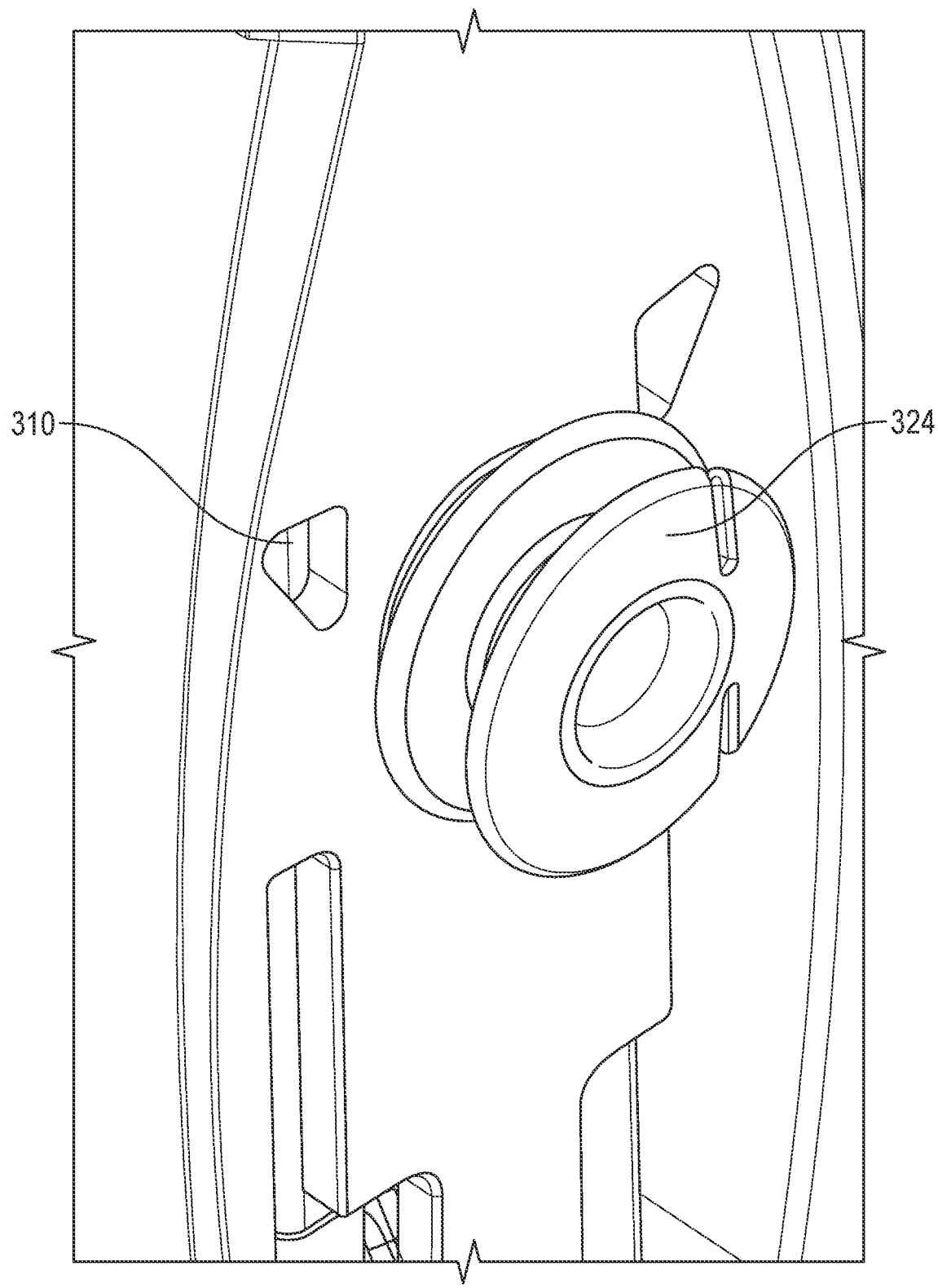
FIG. 15 shows a second spool for deploying a second soft anchor of the tissue repair device of FIGS. 11-14B.

FIG. 15 shows the second spool 324 for the second anchor remains engaged with a second rib on the locking mechanism 422 or a rib on the actuator 310. This prevents loosening of the second spool 324.

Figure 16:
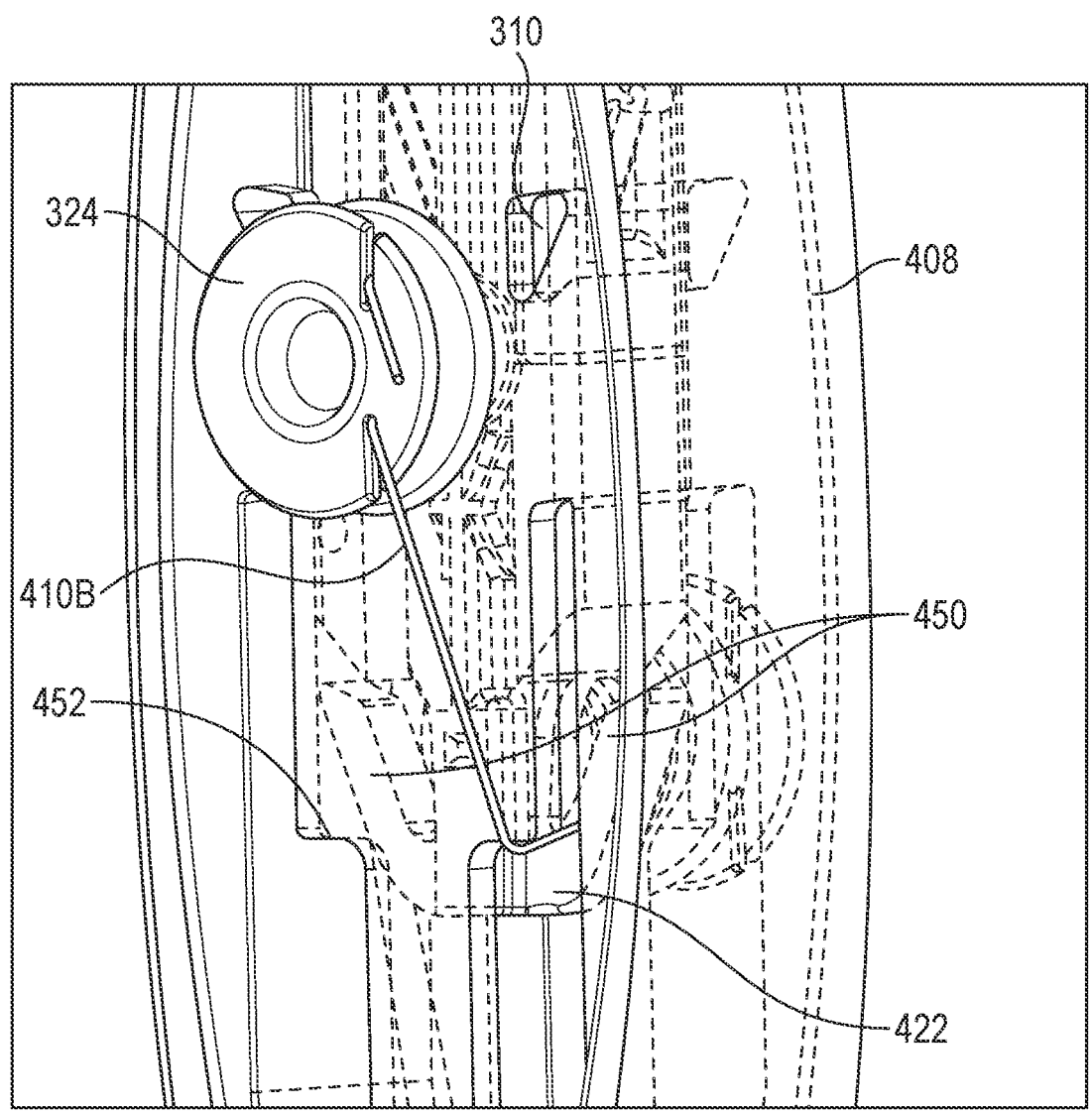
FIGS. 16-19B show operation of the second spool, handle and other mechanisms and deployment of the second soft anchor in accordance with one example of the present application.
Figure 17B:
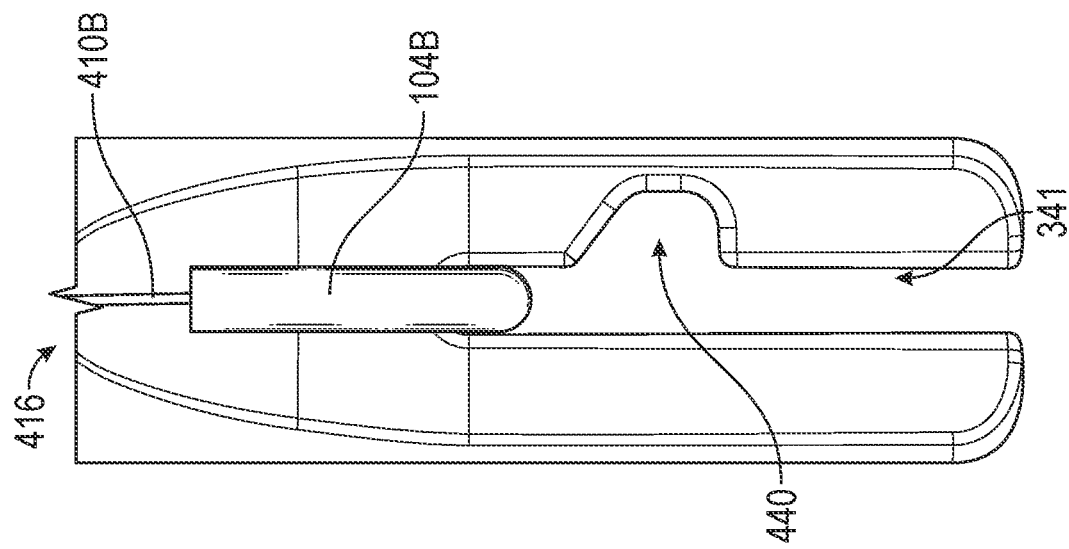
Figure 17A:
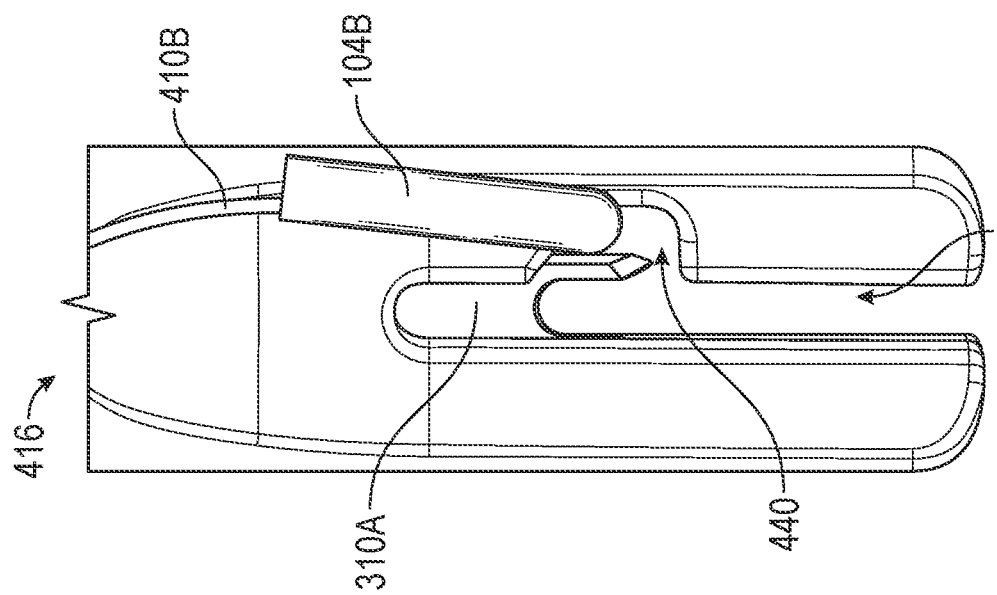

As shown in FIGS. 16, 17A and 17B, as the surgeon pulls up the actuator 310 to retract the actuator 310A from the tissue, features such as flexible arms 450 in the locking mechanism 422 can engage features inside the handle 408. This can occur such as when the arms 450 move past a step 452 or other feature in the handle 408. The second spool 324 can remain locked by the rib 412 (FIG. 13A) on the locking mechanism 422. This locking creates tension on the suture 410B from the second anchor 104B (FIGS. 17A and 17B). The tension applied by the suture 410B can cause the second anchor 104B to slide from the notch 440 into the central slot 341 as the actuator 310A passes the notch 440 in the outer housing of the end effector 416.

Figure 18A:
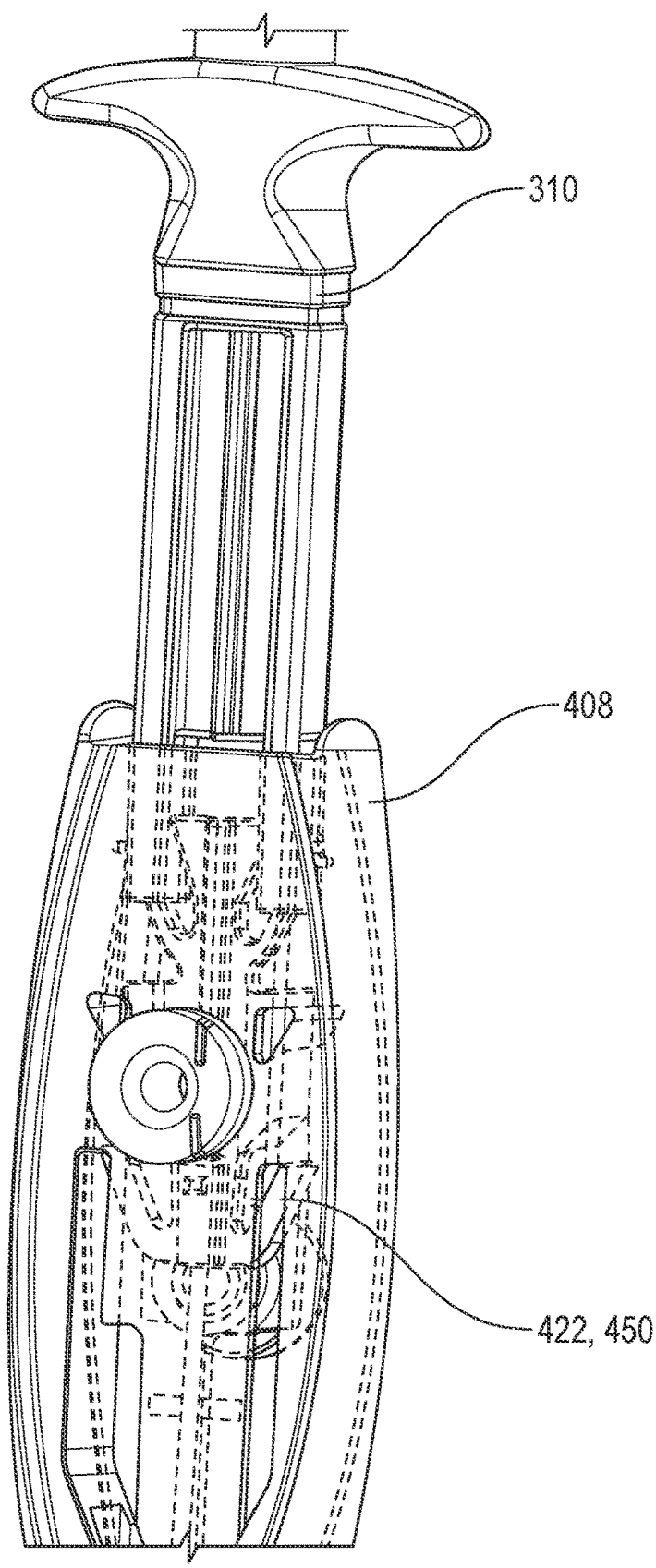

As shown in FIGS. 18A and 18B, the surgeon can continue to pull up on the actuator 310 until they feel a hard stop from the flexible arms 450 of the locking mechanism 422 engaging the handle 408. By this point, a surface feature such as like ramp feature 414 (FIG. 13A) in the locking mechanism 422 can release the second spool in a similar manner similar to the release of the first spool previously described.

Figure 19A:
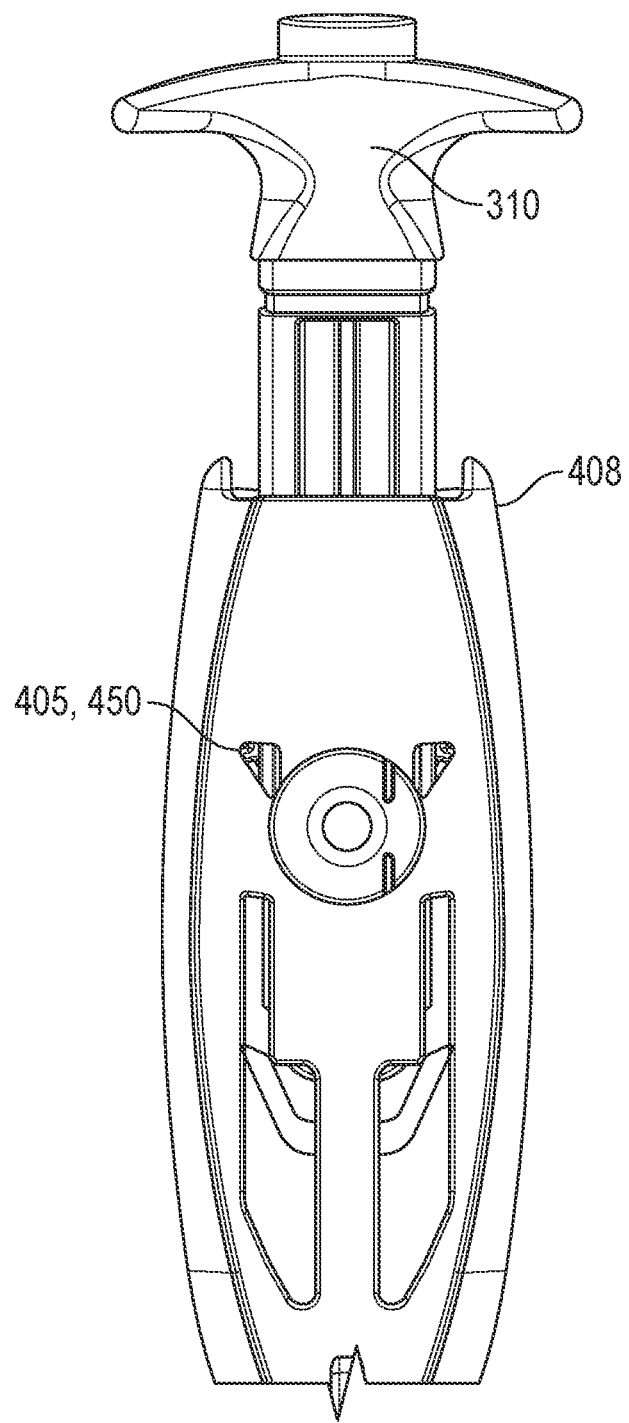
Figure 19B:
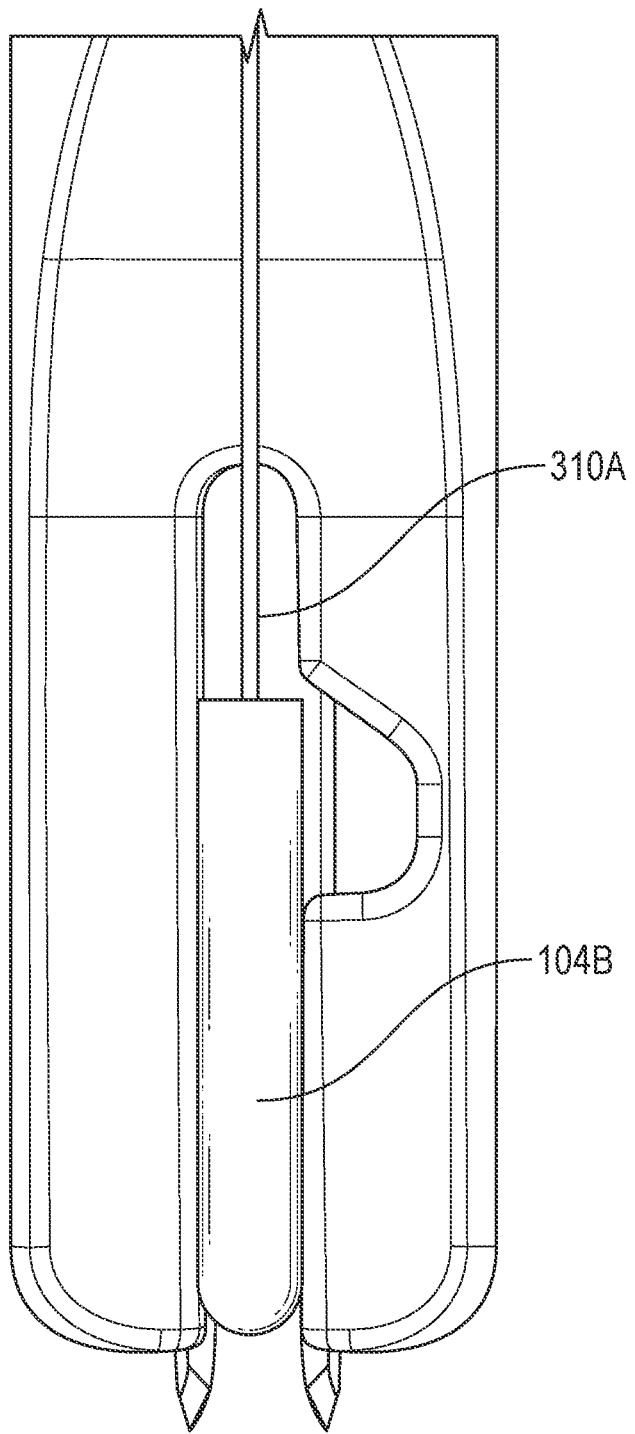

As shown in FIGS. 19A and 19B, after the surgeon actuates the actuator 310 to the stop such as by retracting the actuator back to the position shown in FIG. 19A, the actuator 310 can be pushed distally slightly until the surgeon feels or hears a "click" from the top set of flexible arms 450 popping into the notch 405 or notches in the handle 408. Now, the actuator 310A is in its original position and the second anchor 104B is loaded into the distal tip of the actuator 310A as shown in FIG. 19B. The second anchor 104B can be delivered into the tissue in a similar manner to the first anchor previously described.

Figure 21:
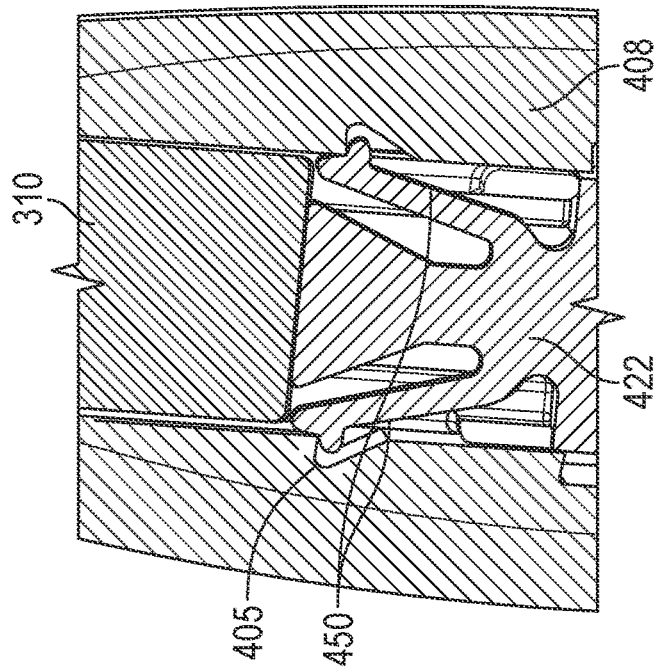
FIGS. 20, 20A and 21 show how features of the proximal portion of the tissue repair device prevent the punch from moving upward when forced down into tissue in accordance with one example of the present application.
Figure 20A:
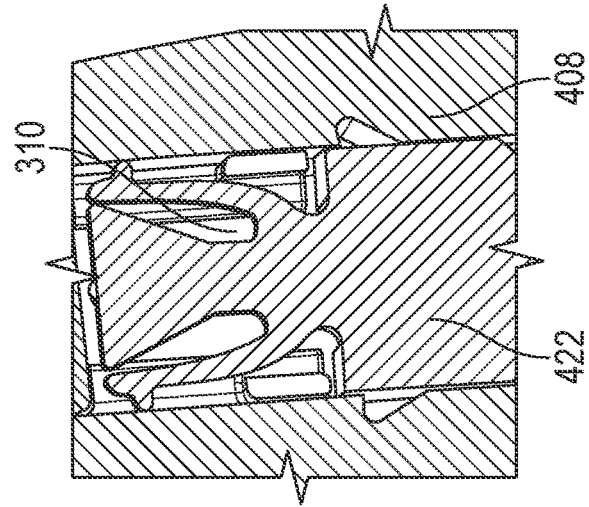
Figure 20:
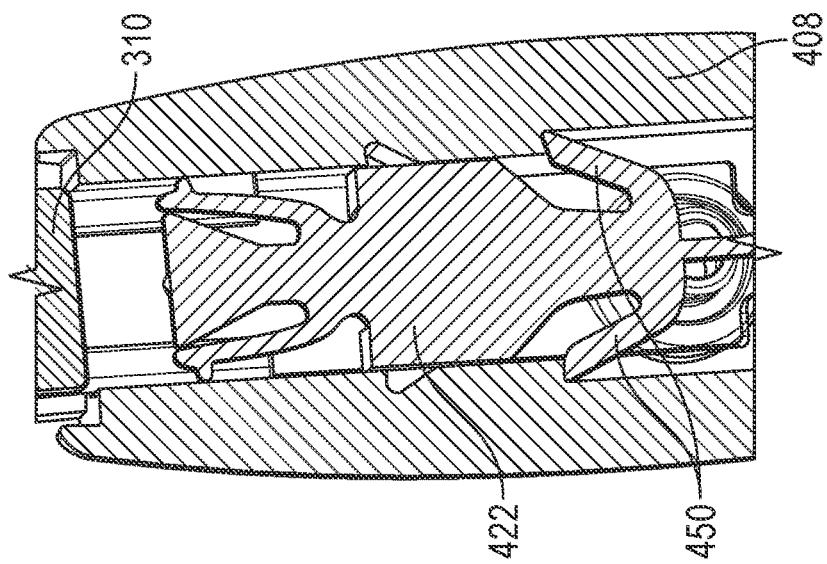

FIGS. 20-21 show various positions for the locking mechanism 422 relative to the handle 408. This includes the fully retracted position (FIG. 20) where lower arms 450 engage a step feature of the handle 408 and an original position (FIG. 21) where the upper arms 450 engage the notch 405. The design of actuator 310, locking mechanism 422, and handle 408 prevents passive upward motion of the locking mechanism 422 when the actuator 310A acts as a punch to engage tissue such as bone. However, the design allows the surgeon to retract the actuator 310A beyond its initial (original) position so that the second anchor can be loaded into the tip of the actuator 310A. This can be accomplished with features on the actuator 310 that causes the arms 450 to flex inward, disengaging the locking mechanism 422 from the handle 408 temporarily and allowing the actuator 310 and 310A (not shown) to move proximally to the fully retracted position of FIG. 20.

Figure 22B:
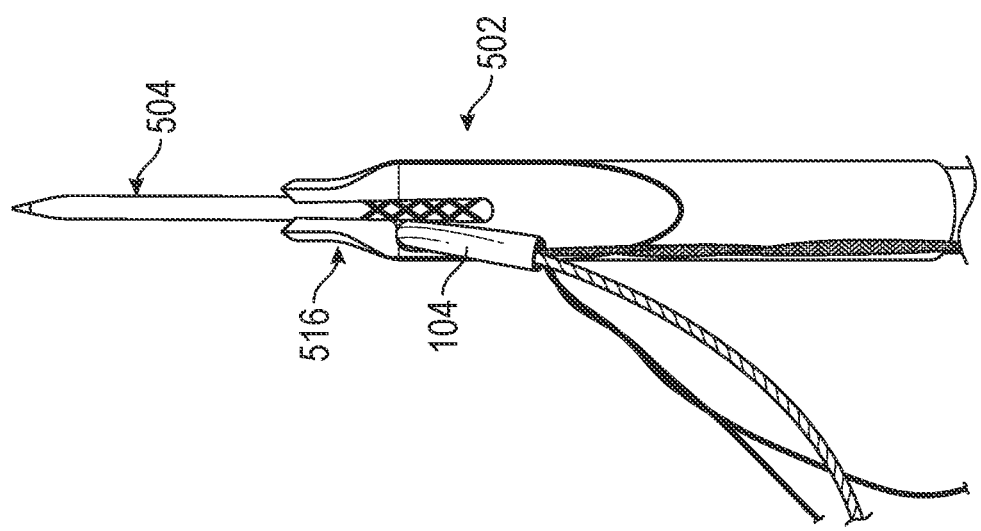
FIGS. 22A and 22B show a distal portion of a tissue repair device having a soft anchor with one or more loops according to another example of the present application.
Figure 22A:
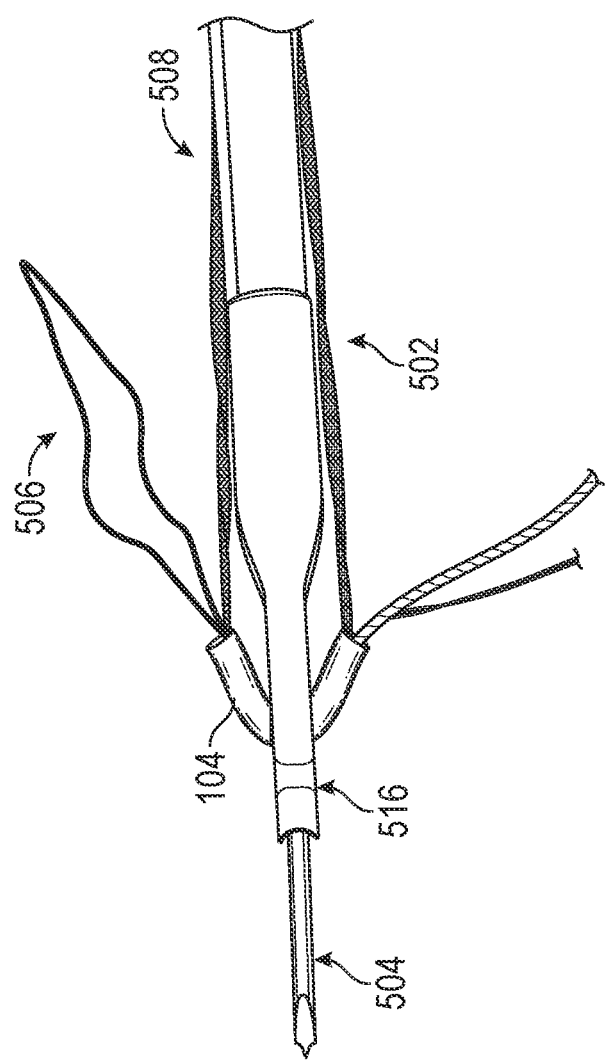

FIGS. 22A and 22B show a tissue repair device 502 similar in construction to those previously described. Thus, the tissue repair device 502 will not be described in great detail other than to describe further or different features not previously described.

The tissue repair device 502 can include an insert 504 at a distal end such as a drill bit, sharp or other puncture apparatus. This insert 504 can be temporary and can be coupled to or decoupled from the tissue repair device 502. The insert 504 can be used to puncture the tissue (e.g., bone) and can be attachable to or can be a separate component that passes through an end effector 516. The end effector 516 can be configured to carry and pass the soft anchor 104 in a manner similar to that described previously herein. The soft anchor 104 can be used with a wire loop 506 of a suture passer (similar to the one or more loops 112 of FIG. 1) and can be coupled to retention sutures 508. The retention sutures 508 can hold the anchor 104 on the tissue repair device 502 and can be used to deploy the soft anchor 104 in the manner previously described. The wire loop 506 can be part of the suture passer and can be configured to receive and can be retracted to pull one or more sutures (not shown in FIGS. 22A and 22B but shown subsequently in FIGS. 23-32 as one or more suture 510) through a body passage of the soft anchor 104. The one or more sutures (not shown) can be used to couple soft tissue, bone or other anatomy to the soft anchor 104 while the soft anchor 104 is still loaded on the tissue repair device 502 as further demonstrated in FIGS. 23-32. It should be noted with the embodiment of FIGS. 22A-32 that the soft anchor 104 can be coupled to the soft tissue (or other anatomy) via the one or more sutures prior to deployment into the bone. Thus, the soft anchor 104 can be configured as a ZipLoop® (e.g., can be coupled to the one or more sutures) prior to deployment into the bone and while still loaded on the tissue repair device 502.

Figure 23:
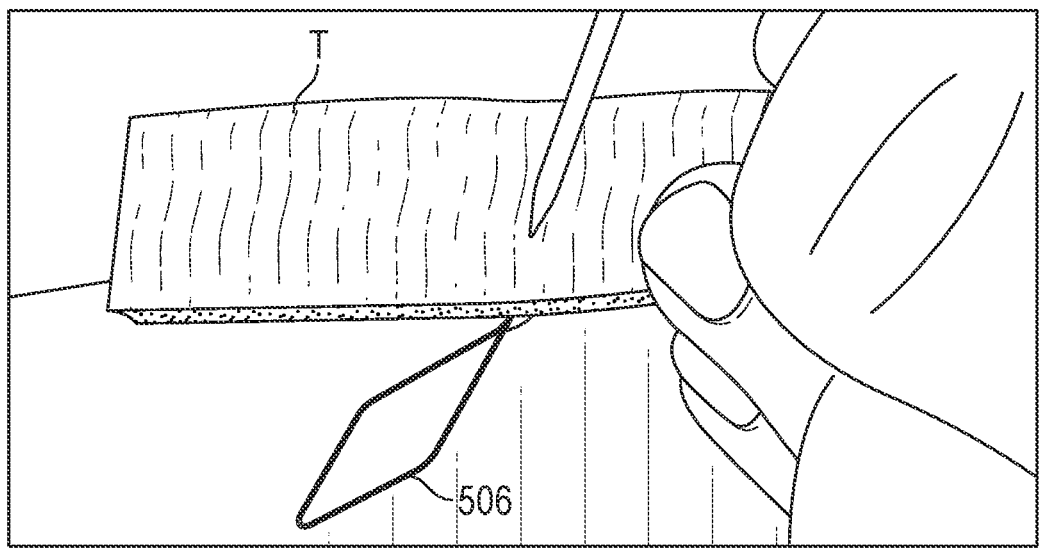
FIGS. 23-32 show a method of creating a suture structure using the tissue repair device having the soft anchor with the loop of FIGS. 22A and 22B in accordance with one example of the present application.
Figure 25:
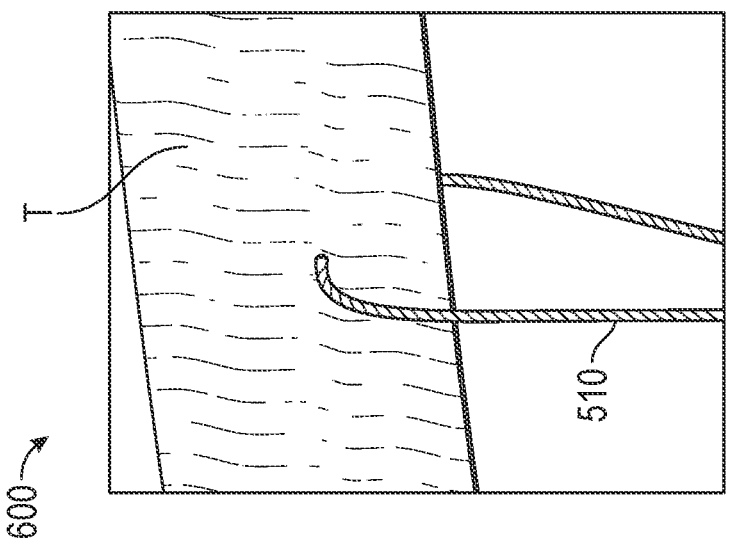
Figure 24:
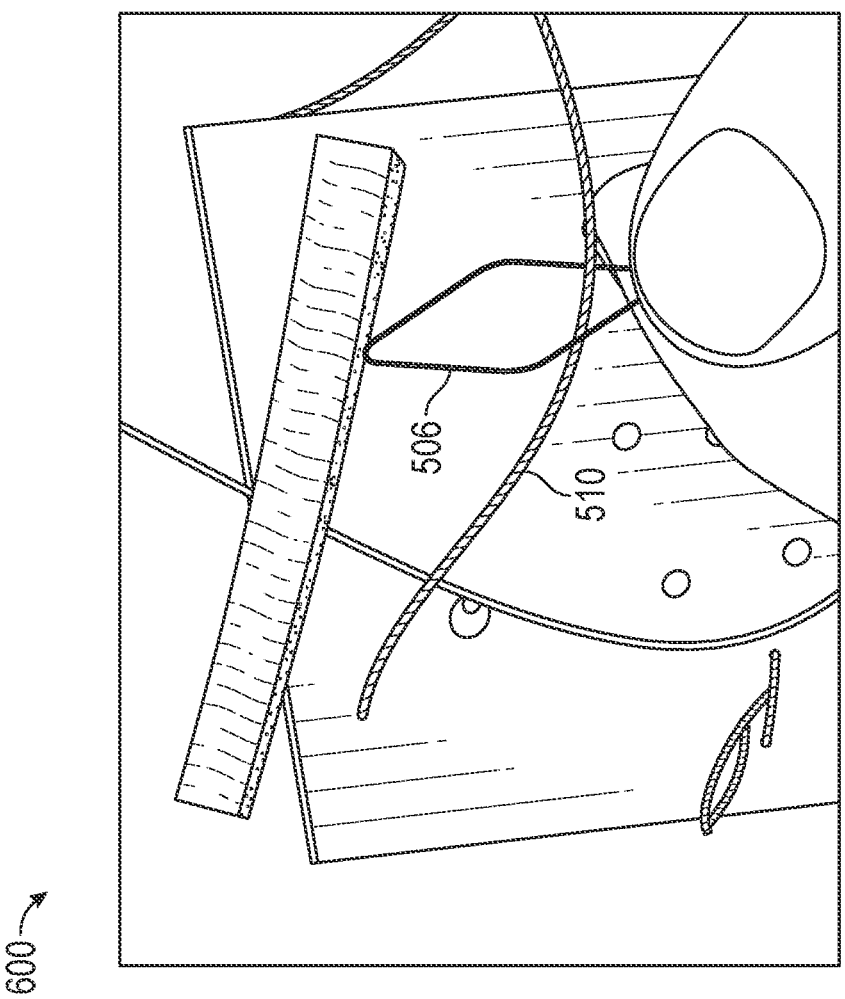

FIGS. 23-32 show a method 600 of creating a suture structure using the tissue repair device 502 having the soft anchor 104 with the loop 506 of FIGS. 22A and 22B. In FIG. 23, the loop 506 can be passed through tissue T. One or more sutures 510 can then be passed through the loop 506 (FIG. 24) and using the loop 506 can be draw through the tissue as shown in FIG. 25.

Figure 26A:
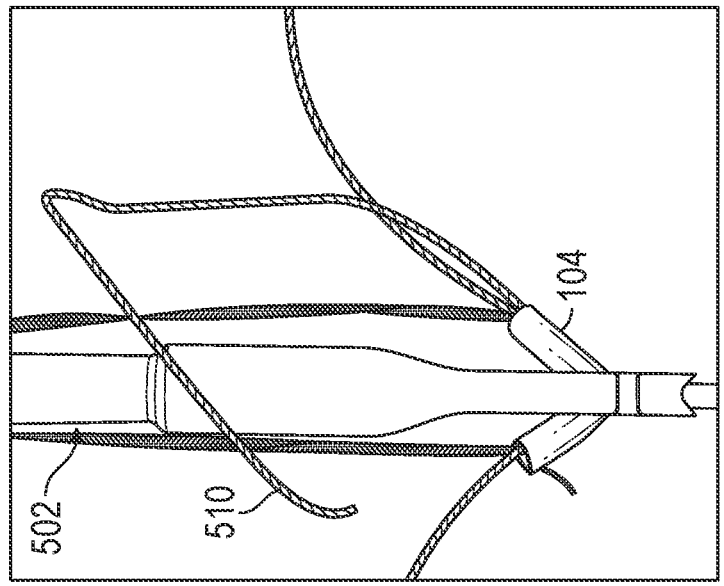
Figure 26:
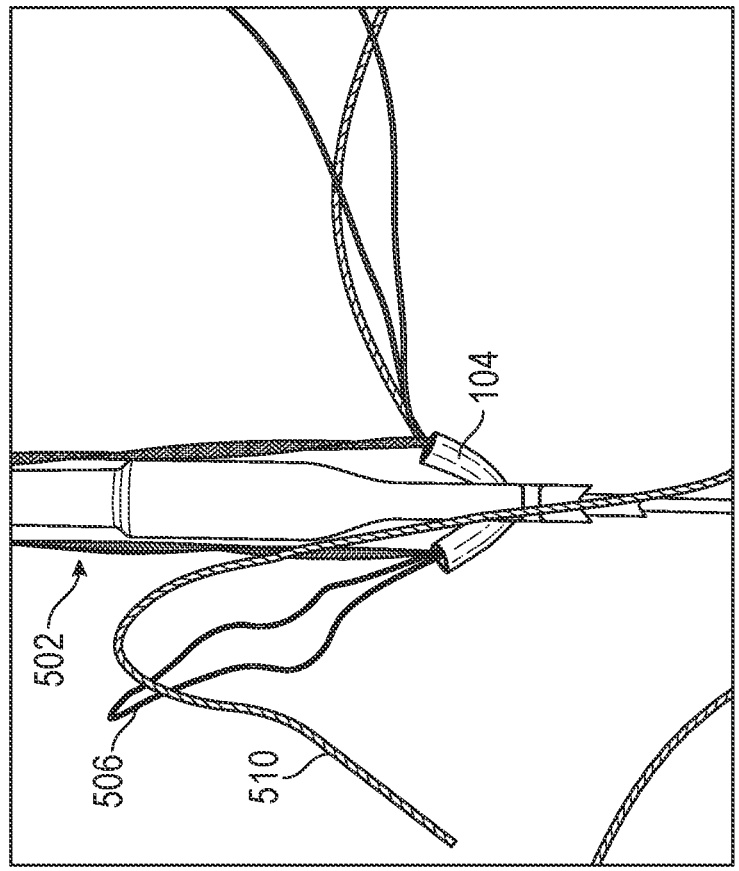
Figure 28:
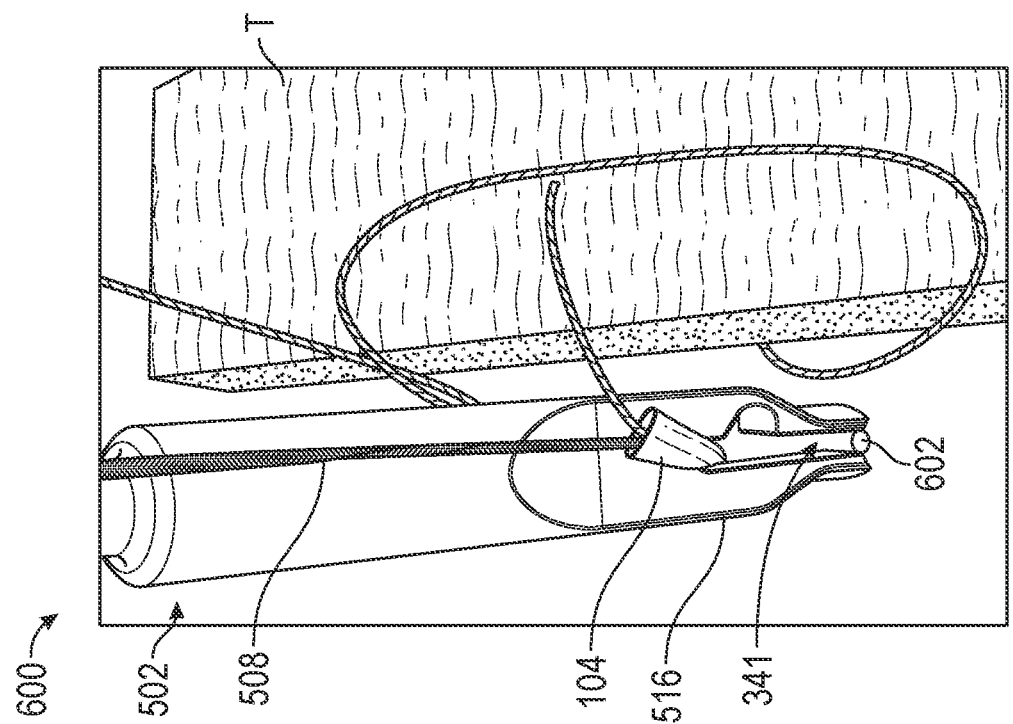
Figure 27:
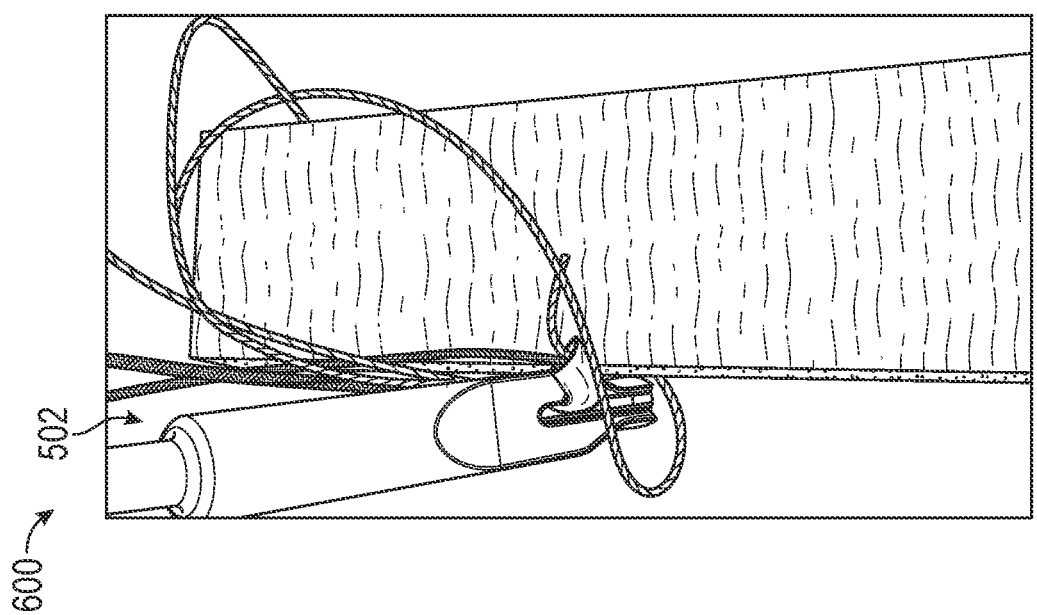

FIGS. 26 and 26A show the one or more suture 510 can then be passed through the anchor 104 or around or through itself to complete a suture loop around the tissue. The one or more suture 510 can also be passed via the loop 506 (FIG. 26) through the soft anchor 104 so that the soft tissue T via the one or more suture 510 is coupled to the soft anchor 104 prior to deployment into the bone and while the soft anchor 104 is still loaded on the tissue repair device 502 as shown in FIG. 26A. The surgeon can hold tension on this suture loop while advancing the actuator 310A (see prior FIGS.) of the tissue repair device 502 to deploy the anchor 104 to the repair site as shown in FIG. 27. As shown in FIG. 28, the insert 504 (FIGS. 22A and 22B) can be used to puncture a hole 602 in the tissue (such as bone) adjacent the soft tissue T. The end effector 516 of the tissue repair device 502 can be placed adjacent the hole 602. The anchor 104 can be deployed from the notch into the central slot 341 by the retention sutures 508 in the manner illustrated previously with regard to prior embodiments.

Figure 30:
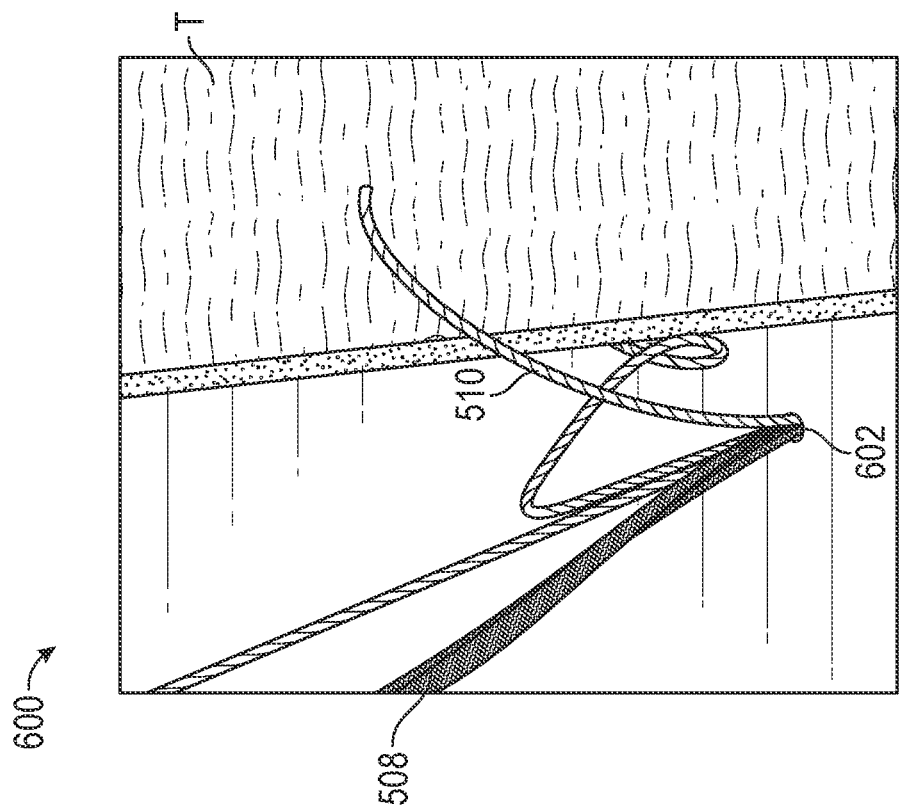
Figure 29:
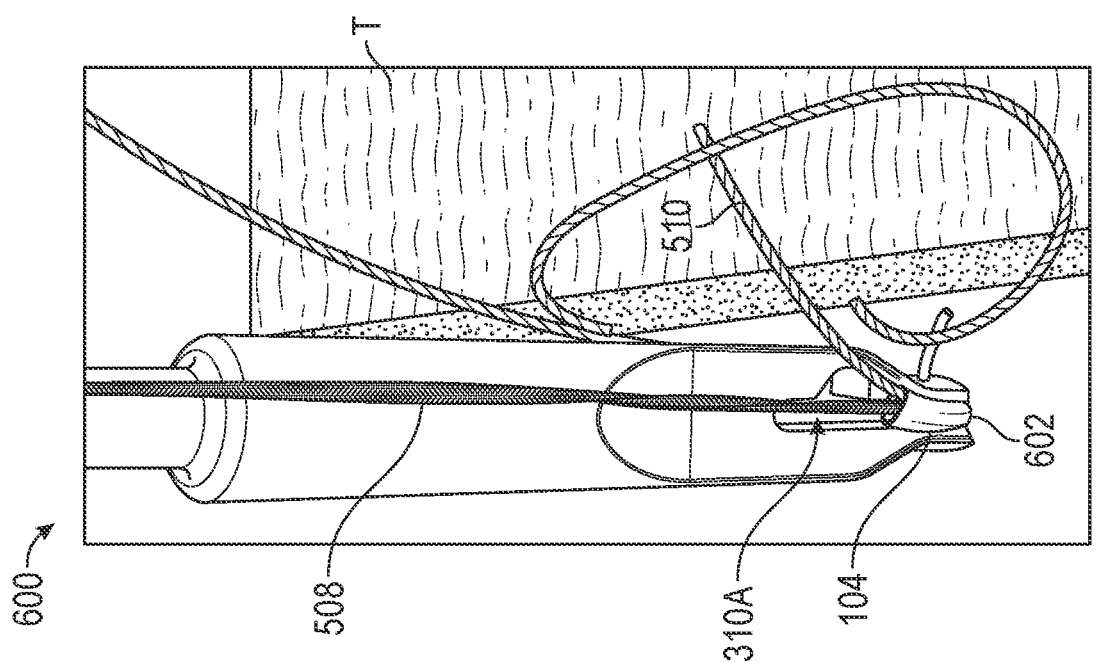
Figure 31:
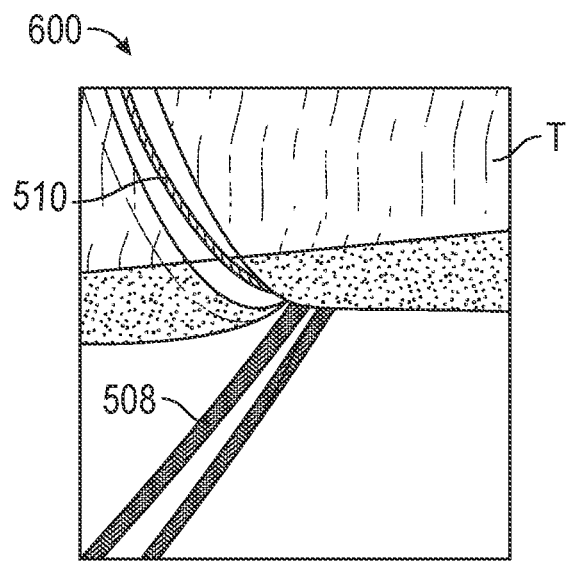
Figure 32:
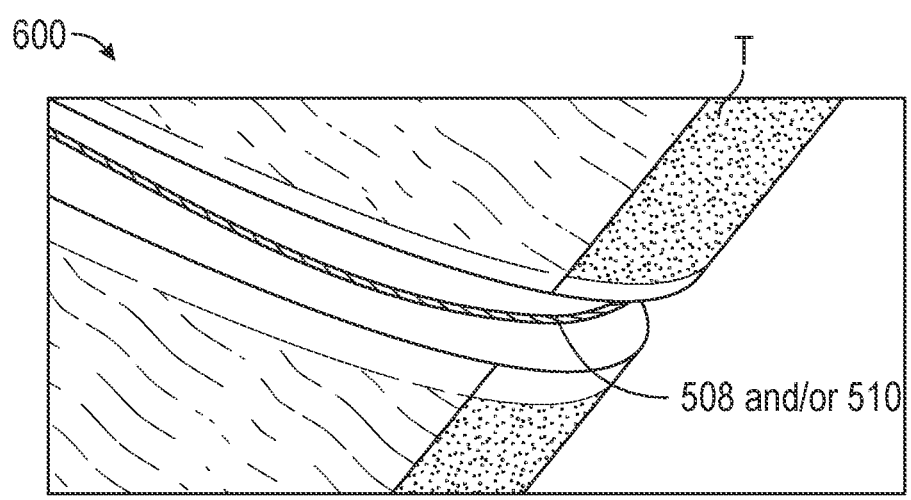

FIGS. 29 and 30 show the anchor 104 (FIG. 29) forced by the actuator 310A down into the hole 602 and placing of the anchor 104 within the hole 602. The sutures including the one or more suture 510 and retention sutures 508 extending from the hole 602 can be tensioned as desired to cinch the loop around the soft tissue T and optionally draw the soft tissue T toward the hole as shown in FIGS. 31 and 32 (and in a manner previously illustrated in FIGS. 4A-4D). The one or more suture 510 and/or retention sutures 508 can be used to tie down additional soft tissue. If desired the retention sutures 508 can be removed from the anchor (not shown in FIGS. 31 and 32) by pulling one side through the anchor to release. Sutures can be cut and tied as desired.

Figure 33:
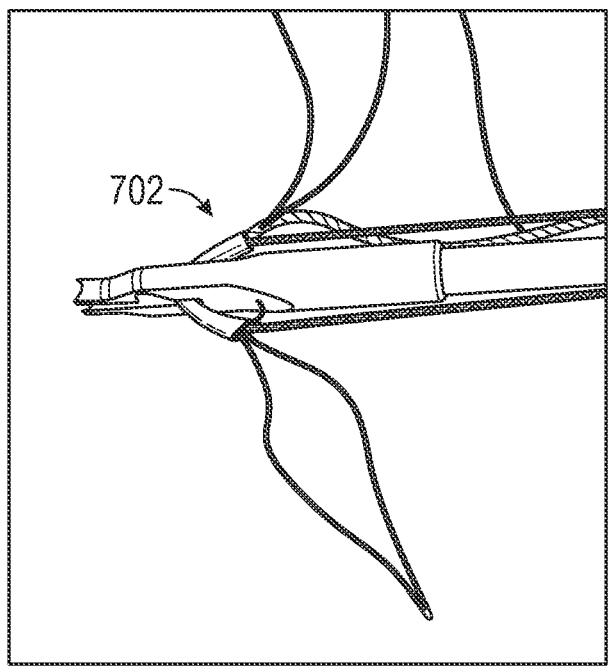
FIG. 33 show a distal portion of a tissue repair device having a soft anchor with one or more loops according to another example of the present application.
Figure 35:
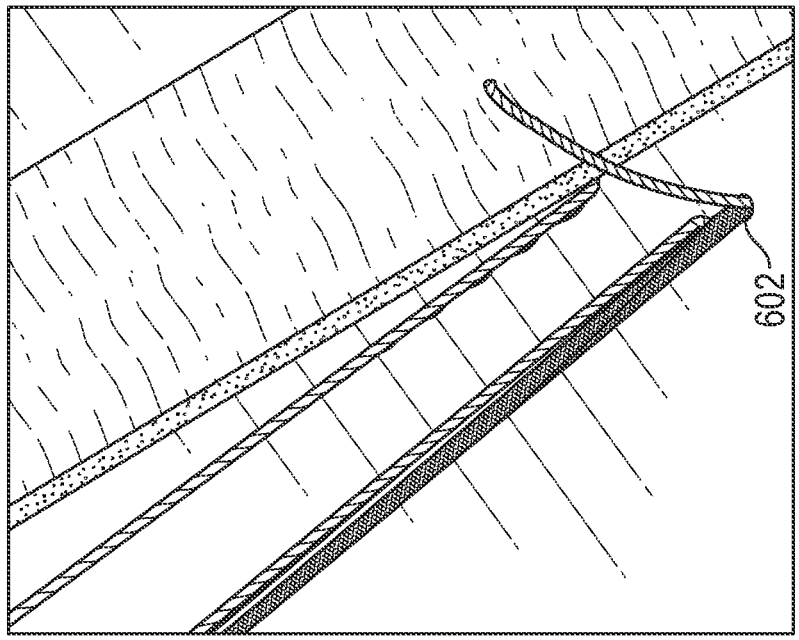
FIGS. 34-37 show parts of an alternative method from the method of FIGS. 23-32 of creating a suture structure using the tissue repair device having the soft anchor with the loop of FIG. 33 in accordance with one example of the present application.
Figure 34:
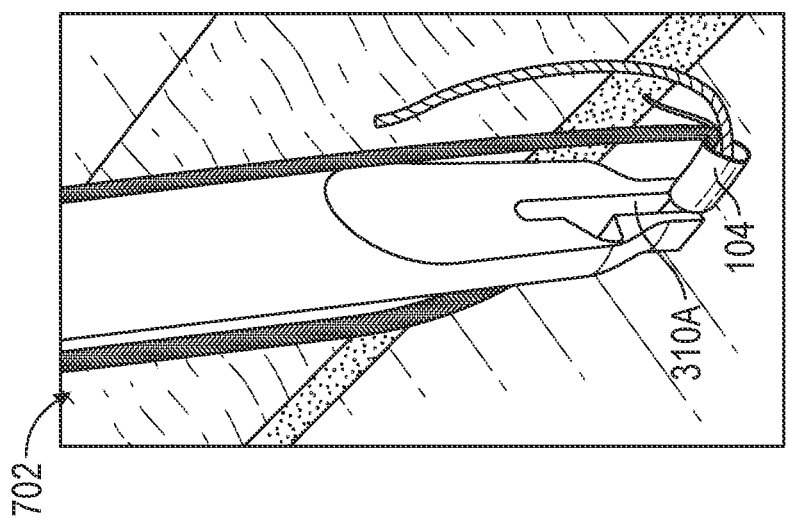

FIG. 33 shows an alternative tissue repair device 702 that does not utilize the insert 504 (FIGS. 22A and 22B) previously described. This modifies the repair method 600 previously described in that the actuator 310A (previously shown) creates the hole 602 (FIG. 35) in the bone (or other tissue) rather than using the insert 504. Actuator 310A can be configured as a punch as previously shown and described to perform this operation and to deploy the anchor 104 as shown in FIGS. 34 and 35.

Figure 36:
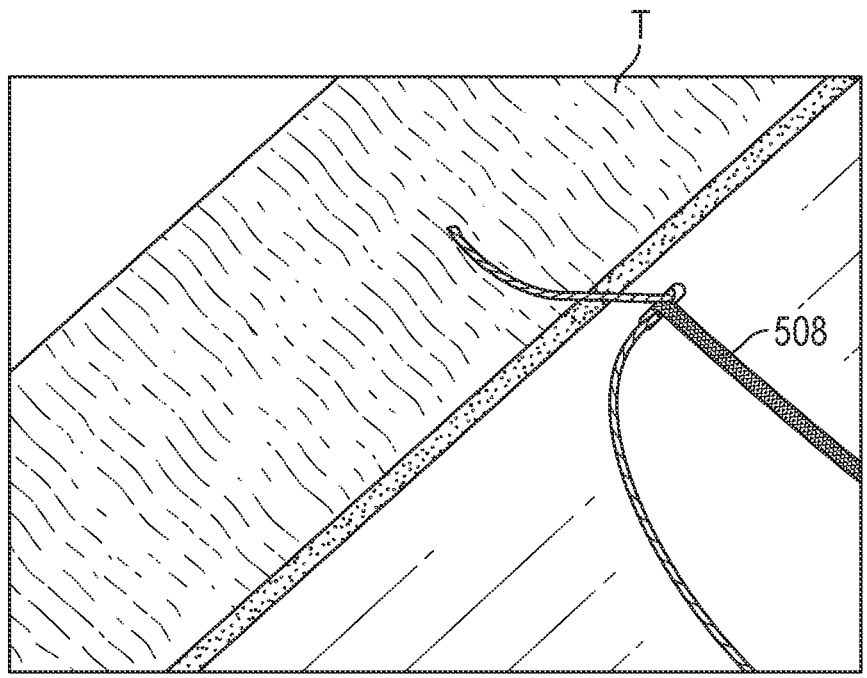
Figure 37:
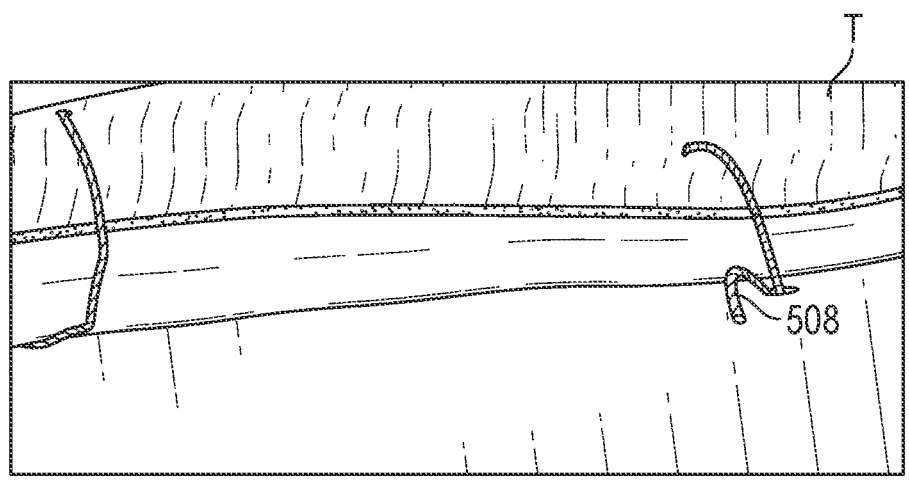

FIGS. 36 and 37 show pulling of the retention sutures 508 from the anchor 104 once deployed into the hole 602. The other sutures can be tensioned and cinched around the tissue T as previously described. Additionally or alternatively as discussed the retention sutures or one or more suture can be used to tie down additional tissue or can be removed from the anchor by pulling through. The tension strands can be cut as desired.

It is further contemplated that the methodology of FIGS. 23-32 and 33-36 can be further modified in that anchor(s) 104 can be loaded into the end effector of the tissue repair device 502 or 702 after passing the suture through the tissue T and creating the suture loop as previously illustrated and described. Thus, the anchor 104 need not be loaded on the tissue repair device 502 or 702 for certain steps of the repair method 600.

The surgeon can choose to position the two or more anchors in a suitable pattern that is matched to address the injury and complete a repair. In some examples, the surgeon can position one anchor above the other, in a so-called horizontal mattress pattern. In other examples, the surgeon can position the anchors side by side, in a so-called vertical mattress pattern. The vertical mattress stitching pattern can be well-suited for meniscal repairs due to its ability to achieve deep and superficial wound closure, edge eversion and precise vertical alignment of the superficial wound margins. The surgeon can insert the first anchor on the inferior meniscal rim. The surgeon can insert the second anchor superior to the tear on the meniscal rim. Implants in this superior meniscal location can require shorter distances of deployment, since the depth of meniscus can be less than the depth at the inferior location. To decrease the needle depth for the superior position, the surgeon can adjust an adjustable depth stop until the needle reaches a desired depth.

Anchors can be or may not be connected to together with strands of suture cinched or otherwise coupled. Thus, in some cases, after deployment of the final soft anchor, the surgeon can tension sutures that connect the first, second, etc. anchors together. For example, after the surgeon retracts the tissue repair device from the joint, a suture loop and a single strand of suture can protrude from the access portal. The suture loop and single strand of suture can be formed from a single piece of suture run through itself and configured as an adjustable loop. If the surgeon pulls on the loop, the loop does not increase in size. If the surgeon pulls on the single strand of suture, the loop shrinks. Deploying the anchors as described above can produce a small loop of suture inside the joint, a larger loop of suture emerging from the skin, and a free strand of suture emerging from the skin. The surgeon can pull on the larger loop to set the anchors at the repair site as desired and can pull the single strand to contract the large loop down to the surface of the tissue such as illustrated in FIG. 37. The surgeon can visually confirm, with a scope, that the anchor(s) is fully set at the repair site such as in the manner illustrated previously. The surgeon can pull on the strand until tension on the second loop matches the tension of the first loop. If desired, the surgeon can use a probe to check the repair site for appropriate tension. Finally, the surgeon can cut the suture. The surgeon can insert a cutter into the access portal and advance the cutter to sever the suture. The combination of the anchors and remaining suture can work together to close the tear or perform other repair.

As discussed previously, the anchors 104, etc. discussed herein can be "soft" (i.e., they can be made from a relatively soft material such as fabric or suture), and thus they can bend, flex and/or deform under the force of a suture or other inserter(s) on the repair device. In some examples, the anchors 104, etc. can be nominally shaped as cylinders, or tubes having a circular or elongated cross-section, but can be configured to deform during assembly into the repair device and/or during deployment.

Many of the FIGURES herein illustrate components of the repair device including the anchors in a highly schematic manner. This is done to better illustrate interaction of various components of the repair device. However, it is recognized that the anchors 104, etc. can have other shapes and can be deformable as discussed above. Similarly, other components of the repair device can have shapes different from those illustrated herein.

According to other examples contemplated herein not all anchors may not be soft and can be made from non-deformable material such as a hard plastic, etc. Thus, according to some examples the anchor(s) can have a cross-section or other geometry that is invariant. In these examples, the anchor(s) can have a hollow interior formed by a tubular shape of the anchor(s).

Although two anchors are illustrated in some embodiments, it is contemplated that further anchors (e.g., three, four or more) could be used with and stored in the repair device. Additionally, the anchors 104, etc. can be differently sized/shaped relative to one another and/or can be formed of different material relative to one another according to some examples.

It will be understood that the foregoing are merely examples, and that other deployment schemes and device configurations can also be used. Furthermore, combinations of the various foregoing examples can be used together as desired according to further contemplated examples. It will be understood that one of ordinary skill in the art can modify the foregoing devices to achieve a desirable deployment of the first anchor and the second anchor.

While this invention has been described as having example designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

Claims Related Examples/Aspects/Techniques

In some aspects, the techniques described herein relate to an end effector for a tissue repair device, including: a housing defining a central slot with one or more notches in communication therewith and a first actuator moveable within the central slot; a deformable first anchor selectively engageable by the first actuator to move along the central slot to release the first anchor from the housing into tissue; and a deformable second anchor configured to be received in at least one of the one or more notches, wherein the second anchor is moveable from the at least one of the one or more notches and is selectively engageable by the first actuator to move along the central slot to release the first anchor from the housing into tissue.

In some aspects, the techniques described herein relate to an end effector, further including an insert configured to couple with the housing and configured to puncture tissue.

In some aspects, the techniques described herein relate to an end effector, wherein the first actuator is configured to extend distal from a distal opening of the slot and is configured as a needle to puncture tissue.

In some aspects, the techniques described herein relate to a tissue repair device, including: an end effector having a housing a defining a central slot and a first actuator moveable within the central slot; at least a first deformable first anchor carried by the end effector and selectively engageable by the first actuator to move along the central slot to release the first anchor from the housing into tissue; a handle having a spool and a locking mechanism configured to selectively control movement of the spool; a shaft coupling the handle with the end effector; and one or more sutures coupling the first anchor to the spool.

In some aspects, the techniques described herein relate to a tissue repair device, further including a second actuator configured to selectively move the first actuator and the locking mechanism.

In some aspects, the techniques described herein relate to a tissue repair device, further including: a deformable second anchor received in the end effector, wherein the second anchor is selectively engageable by the first actuator to move along the central slot to release the first anchor from the housing into tissue; and a second one or more sutures coupling the second anchor to a second spool.

In some aspects, the techniques described herein relate to a tissue repair device, wherein the housing forms one or more notches in communication with the central slot, wherein the second anchor is configured to be received in at least one of the one or more notches, and wherein the second anchor is moveable from the at least one of the one or more notches.

In some aspects, the techniques described herein relate to a tissue repair device, wherein the second anchor is moveable from the at least one of the one or more notches by the spool moving to pull the sutures coupled to the second anchor.

In some aspects, the techniques described herein relate to a tissue repair device, further including: at least a second spool; at least a second anchor, wherein the at least the second anchor is carried by the end effector and is coupled to the at least the second spool by at least one suture.

In some aspects, the techniques described herein relate to a tissue repair device, further including at least a second locking mechanism coupled to the at least the second spool.

In some aspects, the techniques described herein relate to a tissue repair device, wherein the at least the second spool includes three or more spools and the at least the second anchor includes three or more anchors.

In some aspects, the techniques described herein relate to a tissue repair device, further including an insert configured to couple with the housing and configured to puncture tissue.

In some aspects, the techniques described herein relate to a tissue repair device, wherein the first actuator is configured to extend distal from a distal opening of the slot and is configured as a needle to puncture tissue.

In some aspects, the techniques described herein relate to a tissue repair device, including: a housing defining a central slot with one or more notches in communication therewith and a first actuator moveable within the central slot; a deformable first anchor selectively engageable by the first actuator to move along the central slot to release the first anchor from the housing into tissue; and a deformable second anchor configured to be received in at least one of the one or more notches, wherein the second anchor is moveable from the at least one of the one or more notches and is selectively engageable by the first actuator to move along the central slot to release the first anchor from the housing into tissue; a handle having configured to selectively control movement of at least the second anchor from the one or more notches; a shaft coupling the handle with the end effector; and one or more sutures coupling at least the second anchor to the handle.

In some aspects, the techniques described herein relate to a tissue repair device, wherein the handle includes a spool that captures the one or more sutures.

In some aspects, the techniques described herein relate to a tissue repair device, wherein the handle includes a locking mechanism configured to selectively control movement of the spool.

In some aspects, the techniques described herein relate to a tissue repair device, further including a second actuator configured to selectively move the first actuator and the locking mechanism.

In some aspects, the techniques described herein relate to a tissue repair device, further including: at least a second spool; at least a second anchor, wherein the at least the second anchor is carried by the end effector and is coupled to the at least the second spool by at least one suture.

In some aspects, the techniques described herein relate to a tissue repair device, further including at least a second locking mechanism coupled to the at least the second spool.

In some aspects, the techniques described herein relate to a tissue repair device, wherein the at least the second spool includes three or more spools and the at least the second anchor includes three or more anchors.

In some aspects, the techniques described herein include a method of coupling soft tissue to bone with one or more suture. The method can optionally include coupling the one or more suture to the soft tissue, coupling the one or more suture to a deformable first anchor while the deformable first anchor is coupled to an end effector of a tissue repair device, and deploying the deformable first anchor from the end effector into the bone with the one or more suture coupled thereto after the coupling the one or more suture to the deformable first anchor.

In some aspects, the method can optionally include coupling the one or more suture to the deformable first anchor includes passing the one or more suture through a body passage of the deformable first anchor using a loop of a suture passer, wherein the loop is configured to receive the one or more suture.

In some aspects, the method can optionally further include puncturing the bone with an inserter of the tissue repair device.

In some aspects, the method can further optionally include: coupling the one or more suture to a deformable second anchor while the deformable second anchor is coupled to the end effector of the tissue repair device and deploying the deformable second anchor with the one or more suture coupled thereto into the bone after the coupling the one or more suture to the deformable first anchor and the deformable second anchor.

In some aspects, any of the tissue repair devices described herein can be used with the method.

What is claimed is:

1. An end effector for a tissue repair device, comprising:
   a housing defining a central slot with one or more notches in communication therewith and a first actuator moveable within the central slot;
   a deformable first anchor selectively engageable by the first actuator to move along the central slot to release the first anchor from the housing into tissue; and
   a deformable second anchor configured to be received in at least one of the one or more notches, wherein the second anchor is moveable from the at least one of the one or more notches and is selectively engageable by the first actuator to move along the central slot to release the first anchor from the housing into tissue;
   wherein the first actuator is configured to extend distal from a distal opening of the slot and is configured as a needle to puncture tissue.

2. The end effector of claim 1, further comprising an insert configured to couple with the housing and configured to puncture tissue.

3. A tissue repair device, comprising:
   an end effector having a housing a defining a central slot and a first actuator moveable within the central slot;
   at least a first deformable first anchor carried by the end effector and selectively engageable by the first actuator to move along the central slot to release the first anchor from the housing into tissue;
   a handle having a spool and a locking mechanism configured to selectively control movement of the spool;
   a shaft coupling the handle with the end effector;
   one or more sutures coupling the first anchor to the spool;
   at least a second spool; and
   at least a second anchor, wherein the at least the second anchor is carried by the end effector and is coupled to the at least the second spool by at least one suture;
   wherein the at least the second spool comprises three or more spools and the at least the second anchor comprises three or more anchors.

4. The tissue repair device of claim 3, further comprising a second actuator configured to selectively move the first actuator and the locking mechanism.

5. The tissue repair device of claim 3, further comprising:
   a deformable second anchor received in the end effector, wherein the second anchor is selectively engageable by the first actuator to move along the central slot to release the first anchor from the housing into tissue; and
   a second one or more sutures coupling the second anchor to a second spool.

6. The tissue repair device of claim 5, wherein the housing forms one or more notches in communication with the central slot, wherein the second anchor is configured to be received in at least one of the one or more notches, and wherein the second anchor is moveable from the at least one of the one or more notches.

7. The tissue repair device of claim 6, wherein the second anchor is moveable from the at least one of the one or more notches by the spool moving to pull the sutures coupled to the second anchor.

8. The tissue repair device of claim 3, further comprising at least a second locking mechanism coupled to the at least the second spool.

9. The tissue repair device of claim 3, further comprising an insert configured to couple with the housing and configured to puncture tissue.

10. A tissue repair device, comprising:
an end effector having a housing a defining a central slot and a first actuator moveable within the central slot;
at least a first deformable first anchor carried by the end effector and selectively engageable by the first actuator to move along the central slot to release the first anchor from the housing into tissue;
a handle having a spool and a locking mechanism configured to selectively control movement of the spool;
a shaft coupling the handle with the end effector;
one or more sutures coupling the first anchor to the spool;
at least a second spool; and
at least a second anchor, wherein the at least the second anchor is carried by the end effector and is coupled to the at least the second spool by at least one suture;
wherein the first actuator is configured to extend distal from a distal opening of the slot and is configured as a needle to puncture tissue.

11. A tissue repair device, comprising:
an end effector with a housing defining a central slot with one or more notches in communication therewith and a first actuator moveable within the central slot;
a deformable first anchor selectively engageable by the first actuator to move along the central slot to release the first anchor from the housing into tissue; and
a deformable second anchor configured to be received in at least one of the one or more notches, wherein the second anchor is moveable from the at least one of the one or more notches and is selectively engageable by the first actuator to move along the central slot to release the first anchor from the housing into tissue;
a handle having configured to selectively control movement of at least the second anchor from the one or more notches;
a shaft coupling the handle with the end effector;
one or more sutures coupling at least the second anchor to the handle;
a plurality of spools within the handle, each of the plurality of spools coupled to the one or more sutures; and
one or more anchors in addition to the first anchor and the second anchor, wherein the one or more anchors are carried by the end effector and are coupled to respective ones of the plurality of spools.

12. The tissue repair device of claim 11, wherein the handle includes a spool that captures the one or more sutures.

13. The tissue repair device of claim 12, wherein the handle includes a locking mechanism configured to selectively control movement of the spool.

14. The tissue repair device of claim 11, further comprising a second actuator configured to selectively move the first actuator and one or more locking mechanisms of the handle.

15. The tissue repair device of claim 11, further comprising at least a second locking mechanism coupled to the plurality of spools.

16. The tissue repair device of claim 11, wherein the plurality of spools comprises three or more spools and the one or more anchors comprises two or more anchors.

\* \* \* \* \*